(12) United States Patent
Lucon et al.

(10) Patent No.: US 9,099,074 B1
(45) Date of Patent: Aug. 4, 2015

(54) CUSTOM TUNABLE ACOUSTIC INSULATION

(76) Inventors: Peter A. Lucon, Butte, MT (US); Milan Ivosevic, Kinnelon, NJ (US); Scott L. Coguill, Butte, MT (US); Lawrence C. Farrar, Butte, MT (US)

(*) Notice: Subject to any disclaimer, the term of this patent is extended or adjusted under 35 U.S.C. 154(b) by 554 days.

(21) Appl. No.: 12/807,216

(22) Filed: Aug. 30, 2010

Related U.S. Application Data

(63) Continuation-in-part of application No. 10/970,047, filed on Oct. 20, 2004, now Pat. No. 7,959,983.

(60) Provisional application No. 61/275,406, filed on Aug. 28, 2009, provisional application No. 60/513,304, filed on Oct. 21, 2003.

(51) Int. Cl.
*E04B 1/84* (2006.01)
*G10K 11/165* (2006.01)
*E04B 1/68* (2006.01)

(52) U.S. Cl.
CPC ............ *G10K 11/165* (2013.01); *E04B 1/6801* (2013.01); *E04B 1/84* (2013.01)

(58) Field of Classification Search
CPC ....... E04B 1/6801; E04B 1/7604; E04B 1/82; E04B 2/7409; E04B 2001/8414; E04B 2001/8419; E04B 2001/8461; F16F 7/10; F16F 7/104; G10K 11/165
USPC ......... 181/207, 284, 286, 290, 294, 200, 201, 181/202, 203, 204, 205
See application file for complete search history.

(56) References Cited

U.S. PATENT DOCUMENTS

| | | | |
|---|---|---|---|
| 2,434,911 A | 1/1948 | Denyssen |
| 2,530,186 A | 11/1950 | Trimm et al. |
| 3,130,700 A | 4/1964 | Peterson |
| 3,677,471 A | 7/1972 | Deakin |
| 3,873,024 A | 3/1975 | Probst et al. |
| 3,958,758 A | 5/1976 | Piorkowski |
| 4,065,057 A | 12/1977 | Durmann |
| 4,289,807 A | 9/1981 | Christensen et al. |
| 4,394,498 A | 7/1983 | Kastelic |
| 4,582,756 A | 4/1986 | Niinuma et al. |
| 4,624,865 A | 11/1986 | Gindrup et al. |
| 4,688,722 A | 8/1987 | Dellassio et al. |
| 4,711,833 A | 12/1987 | McAneney et al. |
| 4,835,022 A | 5/1989 | Huhne |

(Continued)

FOREIGN PATENT DOCUMENTS

DE     10048355 A1    4/2002

OTHER PUBLICATIONS

Wikipedia Page For Impedance Matching, http://en.wikipedia.org/wiki/Impedance_matching, accessed Apr. 4, 2013.*

(Continued)

*Primary Examiner* — Jeremy Luks
(74) *Attorney, Agent, or Firm* — Robert M. Hunter

(57) ABSTRACT

Acoustic insulation comprising tuned resonant absorbers to absorb sound energy and prevent it from being emitted and a method of installation of the acoustic insulation. The acoustic insulation is preferably placed or sprayed by a thermal spray process. The resonant absorbers are strategically placed in the placed or thermally sprayed material to maximize sound absorption. Discrete mass absorbers may be sealed or left open.

24 Claims, 21 Drawing Sheets

(56) References Cited

U.S. PATENT DOCUMENTS

| | | | |
|---|---|---|---|
| 4,911,956 | A | 3/1990 | Gabryszewski et al. |
| 4,940,623 | A | 7/1990 | Bosna et al. |
| 5,021,259 | A | 6/1991 | Singelyn |
| 5,041,713 | A | 8/1991 | Weidman |
| 5,356,958 | A | 10/1994 | Matthews |
| 5,400,296 | A | 3/1995 | Cushman et al. |
| 5,503,872 | A | 4/1996 | MacKenzie et al. |
| 5,718,863 | A | 2/1998 | McHugh et al. |
| 5,773,121 | A | 6/1998 | Meteer et al. |
| 6,074,194 | A | 6/2000 | McHugh |
| 6,298,963 | B1 | 10/2001 | Kim |
| 6,342,272 | B1 | 1/2002 | Halliwell |
| 6,381,196 | B1 | 4/2002 | Hein et al. |
| 6,423,755 | B1 | 7/2002 | Allen et al. |
| 6,478,234 | B1 | 11/2002 | Klein et al. |
| 6,488,773 | B1 | 12/2002 | Ehrhardt et al. |
| 6,793,976 | B2 | 9/2004 | Klein et al. |
| 6,872,057 | B2 * | 3/2005 | Kim ................. 417/312 |
| 6,958,567 | B2 | 10/2005 | Fuller et al. |
| 7,249,653 | B2 | 7/2007 | Sheng et al. |
| 7,395,799 | B2 * | 7/2008 | Liang et al. ........... 123/195 C |
| 7,395,898 | B2 * | 7/2008 | Yang et al. ............. 181/286 |
| 7,573,177 | B2 | 8/2009 | Fuller et al. |
| 7,712,580 | B2 | 5/2010 | Fuller et al. |
| 2001/0055652 | A1 | 12/2001 | Dalzell, Jr. et al. |
| 2002/0110682 | A1 | 8/2002 | Brogan |
| 2003/0062217 | A1 | 4/2003 | Sheng et al. |
| 2003/0207145 | A1 | 11/2003 | Anderson et al. |
| 2003/0209610 | A1 | 11/2003 | Miller et al. |
| 2006/0131103 | A1 * | 6/2006 | Fuller et al. ............. 181/290 |
| 2006/0172075 | A1 * | 8/2006 | Nagai et al. ............. 427/427.4 |
| 2007/0069434 | A1 | 3/2007 | Kato et al. |
| 2009/0113843 | A1 | 5/2009 | Levit et al. |
| 2010/0175335 | A1 | 7/2010 | Fuller et al. |

OTHER PUBLICATIONS

Wikipedia Page For Melamine, http://en.wikipedia.org/wiki/Melamine, accessed Apr. 4, 2013.*
Wikipedia, Tuned Mass Damper, Jun. 25, 2010, pp. 1-6, WWW domain: en.wikipedia.org/wiki/Tuned_mass_damper.
Deicon, Tuned Absorbers/Dampers, Undated, pp. 1-5, WWW domain: deicon.com/tuned_abs_damper.html#Tuning.
CSA Engineering, Tuned-Mass Dampers: Technical Background, Undated, pp. 1-2, WWW domain: csaengineering.com/vibdamp/tech_bkgrnd.asp.
Farrar, et al., Declaration under Rule 132, 2004, pp. 1-3.
Farrar et al., NASA Phase II STTR Proposal: Radiative Thermal Spray System, May 14, 1998, pp. 3-9, 12-23, 32, 33, 40, 41, Montec Associates, Inc., Butte, MT.
Farrar et al. NASA Phase II STTR Final Report: Radiative Thermal Spray System, Sep. 29, 2003, pp. 1-57, Montec Associates, Inc., Butte, MT.

* cited by examiner

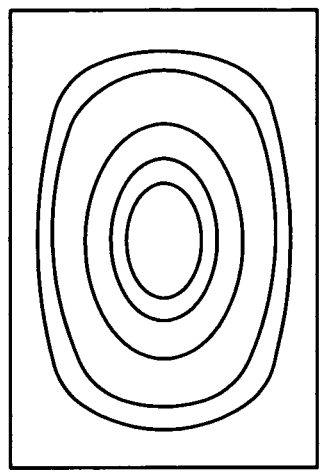 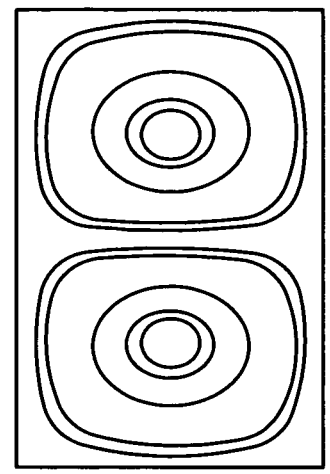
FIG. 5A          FIG. 5B
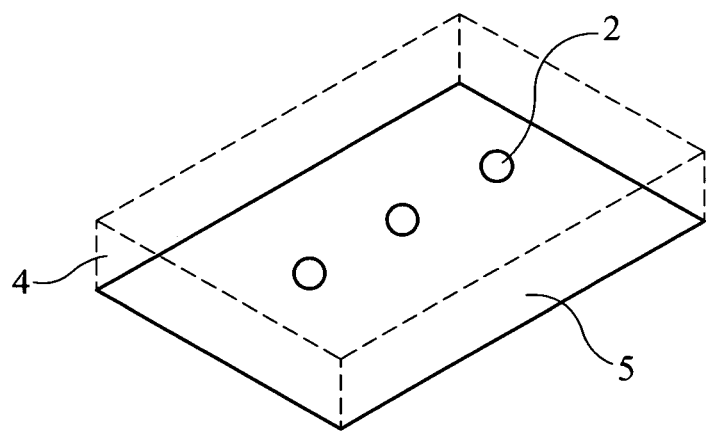
FIG. 5C

US 9,099,074 B1

CUSTOM TUNABLE ACOUSTIC INSULATION

CROSS-REFERENCE TO RELATED APPLICATIONS

This application claims the benefit of U.S. Provisional Patent Application No. 61/275,406, filed Aug. 28, 2009, the disclosure of which patent application is incorporated by reference as if fully set forth herein. This application is also a continuation-in-part of U.S. patent application Ser. No. 10/970,047, filed Oct. 20, 2004 now U.S. Pat. No. 7,959,983, which claims the benefit of U.S. Patent Application No. 60/513,304, filed Oct. 21, 2003, the disclosures of which applications are also incorporated by reference as if fully set forth herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. N00014-08-M-0266 awarded by the United States Navy.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention relates to acoustic insulation. In particular, the present invention relates to tunable acoustic insulation.

Acoustic insulation background art is characterized by U.S. Pat. Nos. 3,130,700; 5,400,296; 6,298,963; 6,381,196; 6,958,567; 7,249,653; 7,573,177 and 7,712,580; and U.S. Patent Application Nos. 2003/0062217; 2007/0069434; 2009/0113843 and 2010/0175335; the disclosures of which patents and patent applications are incorporated by reference as if fully set forth herein. The background art is characterized by the following WWW domains: en.wikipedia.org/wiki/Tuned_mass_damper; deicon.com/tuned_abs_damper.html#Tuning and csaengineering.com/vibdamp/tech_bkgrnd.asp.

Thermal spray system background art is characterized by U.S. Pat. Nos. 2,434,911; 2,530,186; 3,677,471; 3,873,024; 3,958,758; 4,065,057; 4,289,807; 4,688,722; 4,835,022; 4,911,956 4,940,623; 5,021,259; and 5,041,713; 5,356,958; 5,503,872; 5,718,864; 6,074,194; 6,342,272; 6,478,234; 6,488,773; and 6,793,976; U.S. Statutory Invention Registration No. H2035; and U.S. Patent Application Nos. 2001/0055652; 2002/0110682; 2003/0207145; and 2003/0209610; the disclosures of which patents, invention statutory registrations and patent applications are incorporated by reference as if fully set forth herein. The background art is also characterized by U.S. Pat. Nos. 3,801,020; 3,958,758; 4,416,421; 4,694,990; 5,236,327; 5,285,967; 5,503,872; 5,932,293 and 7,216,814; by U.S. Patent Applications Nos. US2006/166153 and US2009/095823; by International Patent Application No. PCT/US2007/009021; and by International Patent Application Publication No. WO/2008/127227; the disclosures of which patents and patent application publications are incorporated by reference as if fully set forth herein.

BRIEF SUMMARY OF THE INVENTION

As used herein, the following terms and variations thereof have the meanings given below, unless a different meaning is clearly intended by the context in which such term is used:

"A," "an" and "the" and similar referents used herein are to be construed to cover both the singular and the plural unless their usage in context indicates otherwise.

"About," "approximately," and "in the neighborhood of" mean within ten percent of a recited parameter or measurement, and preferably within five percent of such parameter or measurement.

"Comprise" and variations of the term, such as "comprising" and "comprises," are not intended to exclude other additives, components, integers or steps.

"Exemplary," "illustrative," and "preferred" mean "another."

"Viscoelastic material" means "a material that that exhibits both viscous and elastic characteristics when undergoing deformation."

"Natural frequency" means "maximum amplitude frequency (or maximum amplitude natural frequency)", which is defined as "the frequency at which the maximum displacement, velocity or acceleration of the object takes place."

One purpose of the invention is to provide low frequency noise mitigation. In an illustrative embodiment, the invention is a tunable acoustic spray on insulation for mitigating sound energy. In this embodiment, the invention uses a combination of elastomeric or viscoelastomeric materials coupled with a plurality of discrete, rigid materials that can be tuned to mitigate sound at different frequencies and to absorb various levels of sound energy as desired for the application.

In an illustrative embodiment of the invention, one or more discrete masses are added to a material that is sprayed onto a substrate or underlying structure to create a means of absorbing sound energy. The discrete masses are capable of absorbing different amounts of sound energy depending on their configuration. The configuration of the discrete masses varies by size, placement, orientation, density and coupled effects by other near masses. The character and properties of the polymer material can be altered during the spray process to achieve the desired absorption. Placement and orientation of the discrete masses also affects the amount of effective absorption and stored energy the compliant material has on the mass. The density of the discrete mass primarily affects the frequency range of the sound absorbing discrete mass system. The higher the density is, the lower the absorbing frequency.

In an illustrative embodiment, the invention is an acoustic insulation for an underlying structure having an underlying structure impedance and a underlying structure surface that oscillates as it emits sound, said underlying structure surface having a mode shape with a plurality of anti-nodes, each of said anti-nodes having a natural frequency, said acoustic insulation comprising: a sprayed-on thermoplastic polymer matrix that is installed on and adheres to the underlying structure; and a plurality of discrete masses that are suspended in said polymer matrix; wherein each of said discrete masses is disposed adjacent to one of the anti-nodes and is tuned to have an impedance that is approximately the same as the underlying structure impedance and that is operative to resonate at the natural frequency of the adjacent anti-node. In another embodiment, said polymer matrix comprises: a viscoelastic material. In another embodiment, said viscoelastic material comprises: an open-cell foam or a closed cell foam, or combination thereof. In another embodiment, said polymer matrix comprises: a homogeneous layer or a plurality of heterogeneous layers. In another embodiment, each of said a plurality of discrete masses is made out of a material having a density that is higher than that of said polymer matrix. In another embodiment, each of said a plurality of discrete masses is made out of a material having an elastic constant that is higher than that of said polymer matrix. In another embodiment, the acoustic insulation further comprises: a fire retardation member, a blast protection member and/or a projectile protection member, said member or members being installed on said polymer matrix.

In another illustrative embodiment, the invention is a discrete mass absorber for mounting on an underlying structure having an underlying structure impedance and a underlying structure surface that oscillates as it radiates sound, said underlying structure surface having an anti-node having a natural frequency, said discrete mass absorber comprising: a polymer matrix made by combining a thermoplastic material and a blowing agent in a thermal spray system; and a discrete mass that is disposed within said polymer matrix; said discrete mass being tuned to have an impedance that is approximately the same as the underlying structure impedance and being operative to resonate at the natural frequency. In another embodiment, the discrete mass absorber further comprises: a housing within which said polymer matrix is disposed. In another embodiment, said housing is hermetically sealed. In another embodiment, the discrete mass absorber further comprises: a plurality of discrete masses that are disposed within said polymer matrix; each of said discrete masses being tuned to have an impedance that is approximately the same as the underlying structure impedance and being operative to resonate at the natural frequency.

In another illustrative embodiment, the invention is a method for providing sound insulation for a sound generating plate, the method comprising: determining the mode shapes of the sound generating plate; determining the locations of the anti-nodes for each said mode shape; tuning a resonant absorber to resonate at the natural frequency of at least one of said anti-nodes; thermally spraying a polymer material onto said sound generating plate; and placing a resonant absorber within said polymer material adjacent at least one of said anti-node locations. In an alternative embodiment, said determining the mode shapes step comprises at least one of the following: performing a finite element analysis, performing thermo-vibrometry, performing laser vibrometry, using an array of accelerometers, using thermography, using sonar, using a displacement sensor, using a velocity sensor, and using a strain sensor. In another embodiment, said determining the anti-node locations step comprises at least one of the following: performing a finite element analysis, performing thermo-vibrometry, performing laser vibrometry, using an array of accelerometers, using thermography, using sonar, using a displacement sensor, using a velocity sensor, and using a strain sensor. In another embodiment said tuning a resonant absorber step comprises: selecting said polymer material; selecting a shape, a size, a density and/or an orientation for the resonant absorber; selecting a thickness and a damping ratio of said polymer material to apply to said sound generating plate before said resonant absorber is emplaced; and selecting a thickness and a damping ratio of said polymer material to apply after said resonant absorber is emplaced.

In another illustrative embodiment, the invention is a method for adjusting the effectiveness of acoustic energy transfer from a mass to a foam web in which the mass is disposed, said method comprising: adjusting the number of foam web connections to the mass; and adjusting the elasticity of the foam web; adjusting the proportion of open space in the foam web; adjusting the cross-sectional area of the foam web; adjusting the aspect ratio of the mass; and adjusting the surface to volume ratio of the mass.

In yet another illustrative embodiment, the invention is a method of attenuating the sound emitted from a plate or membrane having a plurality of anti-nodes, said method comprising: determining a location and a natural frequency for each of the anti-nodes; configuring a plurality of resonators by tuning each resonator to resonate at said natural frequency on one of the anti-nodes when said a plurality of resonators is supported by a viscoelastic material; installing said viscoelastic material comprising a thermoplastic and a blowing agent on the plate or membrane; and installing one of said resonators in said viscoelastic material adjacent to each of said locations. In another embodiment, each said resonator is configured by selecting a resonator density, selecting a resonator size, selecting a resonator shape, selecting a resonator orientation and/or selecting a distance between said resonator and the plate or membrane. In another embodiment, said viscoelastic material is installed by thermal spraying. In another embodiment, each said resonator is installed by embedding it in said viscoelastic material. In another embodiment, the thermoplastic is a polyethylene co-polymer. In another embodiment, the blowing agent is sodium bicarbonate. In another embodiment, said viscoelastic material is formed by thermally spraying at atmospheric pressure a polyethylene co-polymer plus about ten percent by weight sodium bicarbonate. In another embodiment, said viscoelastic material is rendered adherent by thermally spraying a polyethylene copolymer plus about 15 by weight methacrylic acid. In another embodiment, said viscoelastic material is rendered flame retardant by thermally spraying polyethylene copolymer plus a flame retardant additive.

In another illustrative embodiment, the invention is a method of forming an acoustic insulation on an underlying structure, said method comprising: introducing a mixture of a carrier gas, a polymer and a blowing agent into an inner chamber of a thermal spray gun; introducing a first gas into an annular region surrounding said inner chamber of the thermal spray gun and introducing said first gas into said inner chamber through a plurality of openings from said annular region into said inner chamber; heating said first gas to yield a heated gas; heating said mixture by mixing it with said heated gas, such that said polymer does not substantially build up on said inner chamber; spraying said heated mixture onto the underlying structure to form a first polymer matrix layer; placing a plurality of tuned masses on said first polymer matrix layer; and spraying said heated mixture onto the underlying structure to form a second polymer matrix layer. In another embodiment, said first polymer matrix layer has a first set of properties and said second polymer matrix layer has a second set of properties, at least one of said first set of properties being different from at least one of said second set of properties. In another embodiment, said first polymer matrix layer has one or more first thicknesses and said second polymer matrix layer has one or more second thicknesses, at least one of said one or more first thicknesses being different from one of said one or more second thicknesses.

In another illustrative embodiment, the invention is a method of forming an acoustic insulation on an underlying structure, said method comprising: introducing a mixture of a carrier gas, a polymer and a blowing agent into an inner chamber of a thermal spray gun; introducing a first gas into an annular region surrounding said inner chamber of said thermal spray gun and introducing said first gas into said inner chamber through a plurality of openings from said annular region into said inner chamber; heating said first gas to yield a heated gas; heating said mixture by mixing it with said heated gas, such that said polymer does not substantially build up on said inner chamber; spraying said heated mixture onto the underlying structure to form a first polymer matrix layer; placing a plurality of tuned masses on said first polymer matrix layer; and spraying said heated mixture onto the underlying structure to form a second polymer matrix layer. In another embodiment, said first polymer matrix layer has a first set of properties and said second polymer matrix layer has a second set of properties. In another embodiment, said first polymer matrix layer has a first thickness and said second polymer matrix layer has a second thickness.

Further aspects of the invention will become apparent from consideration of the drawings and the ensuing description of exemplary embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate exemplary embodiments of the invention. In the drawings:

FIG. 5A is a schematic diagram of a first vibration mode of a steel plate with dimensions 18 inches by 12 inches by 1/16 inch occurring at 114.12 Hertz (Hz). FIG. 5B is a schematic diagram of a second vibration mode: 176.05 Hz of the steel plate of FIG. 5A. FIG. 5C is a schematic perspective view of a configuration model of thermally sprayed polymer insulation with three masses positioned over maximum deflection points of the first and second vibration modes of FIGS. 5A and 5B in accordance with the invention.

Figure 1:
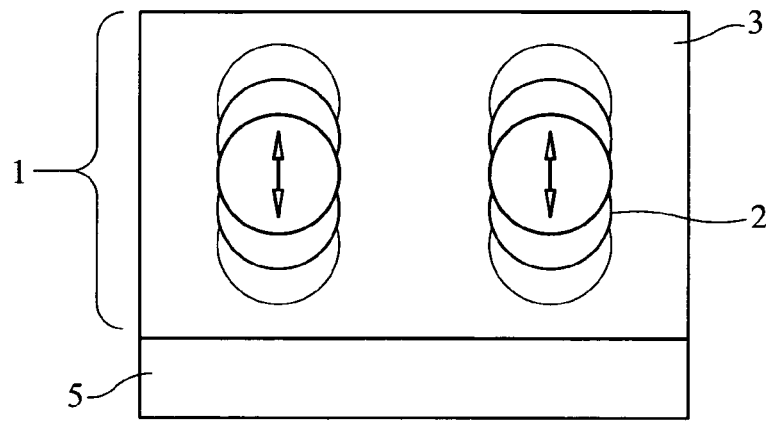
FIG. 1 is a schematic diagram of an illustrative embodiment of the invention. This embodiment is a spray-on solution for low frequency acoustic mitigation comprising an acoustic treatment based on a series of tuned inertial absorbers embedded within a customized limp polymer matrix.

The following reference numerals are used to indicate on the drawings the parts and environment of an illustrative embodiment of the invention:

- 1 acoustic insulation, acoustic treatment
- 2 tuned mass resonators, suspended masses, embedded masses, resonant absorbers
- 3 polymer matrix
- 4 thermally sprayed material, sprayed material
- 5 underlying structure, structure
- 6 fully dense polymer matrix
- 7 sprayed-on-polymer foam matrix
- 8 metal ball
- 9 pneumatic placement gun
- 10 thermal spray system, system, apparatus, device
- 11 background art U.S. Navy treatment
- 12 power distribution segment
- 14 control panel segment, control panel
- 16 powder bin segment, powder bin
- 18 umbilical hose segment, umbilical hose
- 19 cart
- 20 spray gun segment, spray gun
- 22 blowing agent powder, blowing agent
- 23 solid-to-gas starts
- 24 molten polymer
- 25 generated carbon dioxide gas
- 26 cover
- 27 discrete mass absorbers
- 28 housing
- 29 vents
- 30 first layer
- 31 second layer
- 32 first module
- 33 port
- 34 second module
- 36 third module
- 40 carrier gas
- 42 carrier gas flow meter
- 44 carrier gas inline heater
- 45 carrier gas temperature controller
- 46 carrier gas thermocouple, carrier gas feedback thermocouple
- 48 powder, material, powdered polymer foam constituents, polymer powder
- 50 material reservoir, supply hopper, supply tank, hopper
- 52 eductor
- 54 heated/insulated umbilical hose, umbilical hose
- 56 mixture, carrier gas with entrained polymer powder, powder flow
- 60 mixture thermocouple
- 62 voltage cascade
- 64 DC control, voltage cascade switch
- 66 nozzle, spray gun nozzle, spray nozzle
- 68 nozzle assembly
- 70 radiant/convective heating zone, inner cavity, inner chamber, heating zone
- 72 heating zone heater, coiled heater elements
- 74 convective heating gas, convective heating air
- 76 convective heating gas flow meter
- 78 convective/radiant heating annulus, heating annulus
- 80 radiant panels
- 82 substrate
- 84 radiant heat
- 86 nozzle face
- 88 nozzle throat
- 120 cart assembly
- 122 power cord receptacle
- 124 powder bin
- 126 hopper vibrator, supply hopper vibrator
- 128 carrier gas inlets, carrier gas inlet connectors, quick connects
- 130 carrier gas selection solenoid
- 132 bypass solenoid
- 134 spray gun holder
- 140 main power switch
- 142 carrier gas selection switch
- 144 spray gun heater controller
- 146 umbilical hose heater controller
- 148 vibrator control switch
- 150 nozzle cooling medium flow meter
- 152 first auxiliary temperature controller
- 154 second auxiliary temperature controller
- 156 auxiliary activation switch
- 170 grip
- 172 trigger
- 174 radiant shroud
- 176 inlet and outlet connectors, nozzle cooling medium inlet and outlet ports
- 200 gun barrel
- 201 carrier gas inlet
- 202 corona charging tip, charging tip, corona tip
- 203 high-voltage electrode corona discharge space
- 204 heat sink
- 205 corona mount
- 206 locking O-ring
- 208 nozzle support
- 209 inlet/outlet holes
- 210 plenum
- 212 convective heating gas inlet
- 214 aft end
- 216 forward end
- 218 cooling annulus
- 224 front end
- 226 back end 230 radiant core, radiant tube
232 heater element supports
240 slots
242 forward end cap
244 aft end cap
250 orifices, jet orifices, small orifice openings, radial slots
252 circumferential slot
254 air tight electrical connector
256 cooling channel

DETAILED DESCRIPTION OF THE INVENTION

In an illustrative embodiment of the present invention, one or more discrete masses are added to a material that is sprayed onto a substrate to create a means of absorbing sound energy. The discrete masses can absorb different amounts of sound energy depending on their configuration. The configuration of the discrete masses varies by size, placement, orientation, density and coupled effects by other nearby masses. The size affects the amount of polymer material acting as an absorber and as a compliant member. Placement and orientation of the discrete masses also affects the amount of effective absorption and stored energy the compliant material has on the mass. The density of the discrete mass primarily affects the frequency range of the sound absorbing discrete mass system. The higher the density is, the lower the absorbing frequency.

In an illustrative embodiment, the invention is acoustic insulation that involves the addition of discrete, rigid material, steel balls for example, during a spraying process to produce a coating on an underlying structure to absorb sound that would otherwise be transmitted by the underlying structure or the coating itself. The sound source can be on either side of the underlying structure and on either side of the coating, thus the acoustic insulation can be effective in both cases.

Referring to FIG. 1, an illustrative embodiment of the invention is presented. In this embodiment, acoustic insulation 1 is a sprayed-on acoustic treatment that provides low frequency noise mitigation. Acoustic insulation 1 comprises a plurality of tuned mass resonators 2 (e.g., tuned inertial absorbers) embedded in customized limp polymer matrix 3 that is sprayed onto underlying structure 5. The embodiment shown is a sprayed-on acoustic mitigation membrane that comprises 0.5 to 1.0 inch diameter metal balls embedded in a sprayed-on ethylene vinyl acetate (EVA) viscoelastic foam having a custom tuned dynamic modulus.

In illustrative embodiments of the invention, polymer thermal spray system 10 is used to apply acoustic treatment 1 over complex surfaces and/or on top of other acoustic treatments. Preferably, the thermal spray system 10 that is disclosed in U.S. patent application Ser. No. 10/970,047 and that is described in detailed later in this disclosure is used to apply acoustic treatment 1. Acoustic treatment 1 may also be applied using existing spray foam application technology. Alternatively, masses 2 may be held, placed during the spraying process, and then sprayed over, as shown in FIGS. 2A-2D.

In general thermoplastics are the class of polymers most suited to thermal spray system 10. This class of materials can be thermally formed and re-formed as necessary. Select thermoplastics can provide the required sprayable characteristic desired for the acoustic treatment. In particular, the polyethylene co-polymer thermoplastic Escorene Ultra EVA 723.28 (from ExxonMobil Chemical) forms thermally sprayable foam when processed at atmospheric pressure using 10 percent by weight (wt %) sodium bicarbonate as a blowing agent.

In addition, the polyethylene thermoplastics are inherently hydrophobic, preventing water absorption problems with installed foam.

Thermoplastics can be functionalized to provide superior adhesion properties. One example of a highly adherent thermoplastic sprayed foam is composed of Nucrel 960, a polyethylene copolymer with 15 wt % methacrylic acid (from DuPont). The acid content promotes adhesion to steel and aluminum substrates. Flame retardant additives (Fyrol HF-4, from Supresta) are used with thermoplastic polymers to promote the formation of stable char layers when exposed to flame. The char prevents oxygen from getting to the polymer and prevents further polymer burning.

Accordingly, thermally spraying thermoplastics to achieve sound damping and absorption offers several advantages over the existing state of the art. Current methods of applying viscoelastic material involve the application of sheets of insulation to the bulkhead. These sheets are generated with an extruder, and are chosen based on the material believed to address a target frequency or frequency band. These sheets are then fastened to a bulkhead in a procedure that, if not performed correctly, provides a sound path between the bulkhead and the viscoelastic material. In addition, most vessels requiring sound damping, are comprised of many surfaces and complex geometries, and therefore are not sufficiently damped by flat sheets of material.

In an illustrative embodiment, the tuning is performed in-situ or during manufacturing, with specifically selected polymers based on the specific sound frequency of the bulkhead to be attenuated. This allows the user to cover a myriad of complex geometries. Specific methods for adjusting the properties of thermoplastic materials in-situ are discussed below in the disclosure incorporated from U.S. patent application Ser. No. 10/970,047.

In an illustrative embodiment, the process of designing the embedded masses 2 begins with characterization of underlying structure 5, which is a bulkhead in this example. The bulkhead is examined to find the resonant mode shapes, the frequencies of each mode shape and the impedances of each mode shape. The bulkhead may be examined using computer models (standard methods include Finite Element Analysis and Finite Difference Method) or testing (for example, using laser vibrometry, accelerometers, infrared (IR) temperature, sound meters and sound analyzers). The anti-node locations and impedances of the bulkhead are compared with each other and are grouped by location and then again by impedance.

For each group, an absorber is tuned. Tuning is a mathematical technique for matching the impedances and frequencies of the damper with the bulkhead location anti-node modes. The impedance of the absorbers can be approximated mathematically, but testing using a commercial impedance tester is preferred to confirm that the design is correct. For a single frequency and impedance system, the mass is designed to be disposed in the polymer to resonate at the desired anti-node frequency. The frequency is approximated by $$\omega_n = \sqrt{k/m}$$

where 'k' is the spring stiffness of the polymer and 'm' is the mass of the absorber. '$\omega_n$' is the natural frequency of the system. The spring stiffness of the polymer is difficult to predict because polymers are non-linear and viscoelastic. Because of this, the absorber is preferably tested on an impedance tester to fully quantify the impedance and resonant frequency. If the impedance is low, then a polymer with smaller viscoelastic losses is preferably used. If the impedance is high, then a polymer with higher losses is preferably used. In more preferred embodiments, the absorber is large enough to absorb enough energy to effectively obtain the desired sound transmission loss (STL).

For example, in the case of a large bulkhead (12-inch by 18-inch by 0.25-inch thick), there is are anti-nodes in the middle of the plate, as shown in FIG. 1 and the natural frequency is at 60 Hz. If a 0.25 pound-mass (lbm) mass is tuned in a polymer matrix to have substantially the same impedance as the bulkhead and is installed on the anti-node location, it will not have enough mass, and energy absorption by the viscoelastic effect will not absorb enough energy to make a difference in the total STL of the bulkhead that is noticeable. But, if a 1 lbm is tuned to the same impedance and installed, then a noticeable amount of STL is seen on the same plate.

In an illustrative embodiment, a desired tuned solution is also modeled on the bulkhead using analytical techniques to ensure that the resonant bulkhead modes do not shift location and frequency because of the added absorbers. If this occurs, then the total masses may have to be distributed around the anti-node locations to distribute the mass to minimize their effect on the bulkhead resonant frequencies and locations.

Figure 2A:
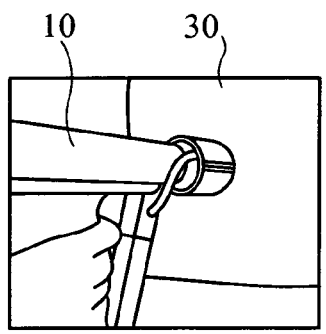
FIGS. 2A-2C are schematic diagrams illustrating steps of an insulation formation process in accordance with an embodiment of the invention.
Figure 2B:
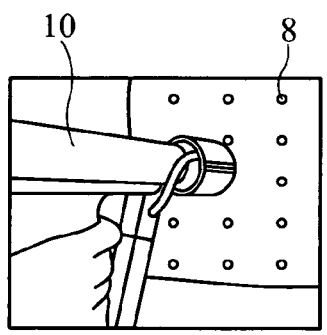
Figure 2C:
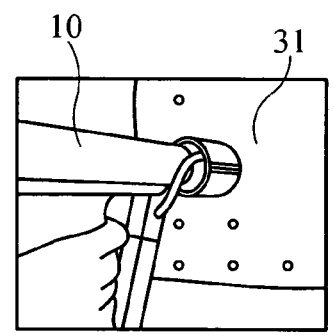
Figure 2D:
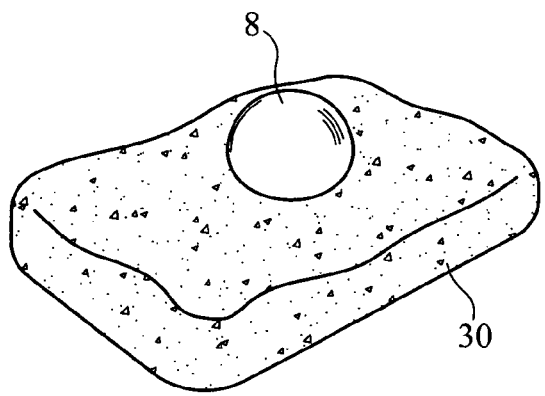
FIG. 2D is a schematic diagram of a steel ball embedded in the bottom half of the sprayed foam shown in FIG. 2B.

Once the solution is installed, a final test of STL is preferably performed to quantify the amount of sound the masses absorb at the desired frequencies. The absorption model for each impedance and mass sizing is implemented and a relation is developed over time. For individual resonators (pucks) being added to a bulkhead with existing insulation, the same method applies as that described above, but the initial model includes the existing insulation. The final model is the complete system with sections of the existing insulation taken out and replaced with the resonator (puck) solution. Referring to FIGS. 2A-2D, the steps of an insulation formation process are presented in accordance with an embodiment of the invention. In step one, spray system 10 is used to apply first layer 30 of viscoelastic polymer matrix 3 as shown in FIG. 2A. In step two, metal balls 8 are embedded in or are otherwise held in place in first layer 30 as shown in FIGS. 2C and 2D. In step three, spray system 10 is used to apply second layer 31 of viscoelastic polymer matrix 3 as shown in FIG. 2C.

Figure 3A:
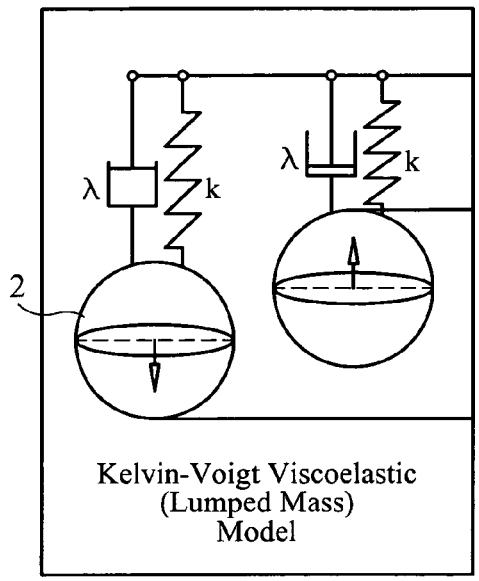
FIG. 3A is a schematic of a Kelvin-Voigt viscoelastic model that is used for a lumped mass analysis of a single metal particle embedded in a viscoelastic matrix in accordance with an illustrative embodiment of the invention.
Figure 3B:
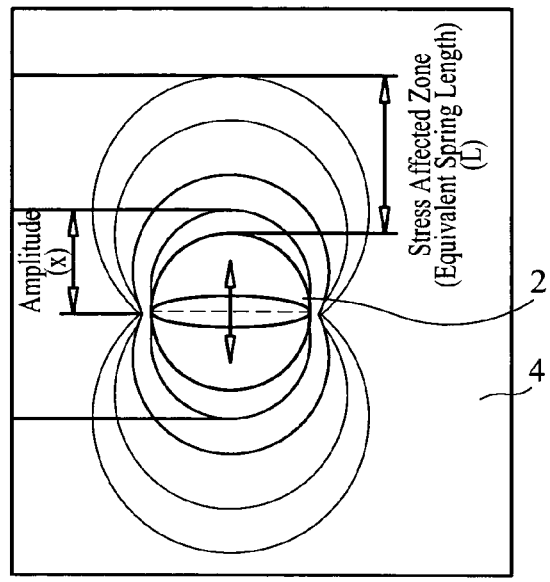
FIG. 3B is a schematic diagram of the single metal particle of FIG. 3A.

Referring to FIGS. 3A and 3B, illustrative models are presented which may be used to design and analyze acoustic insulation 1. Masses 2 placed in sprayed material 4 may be modeled using a lumped mass model. Sprayed material 4 may be modeled various ways, and an illustrative model is the Kelvin-Voigt viscoelastic lumped mass model, shown in FIG. 3A. Thermally sprayed material 4 acts as a spring and damper for each of the suspended masses 2. Each suspended mass 2, spring and damper form a resonant system at a specific frequency. The viscosity of thermally sprayed material 4 can be increased, thus increasing the damping value of the resonant system. As the damping value increases, the system's damping ratio '$\zeta$' also increases.

Figure 4:
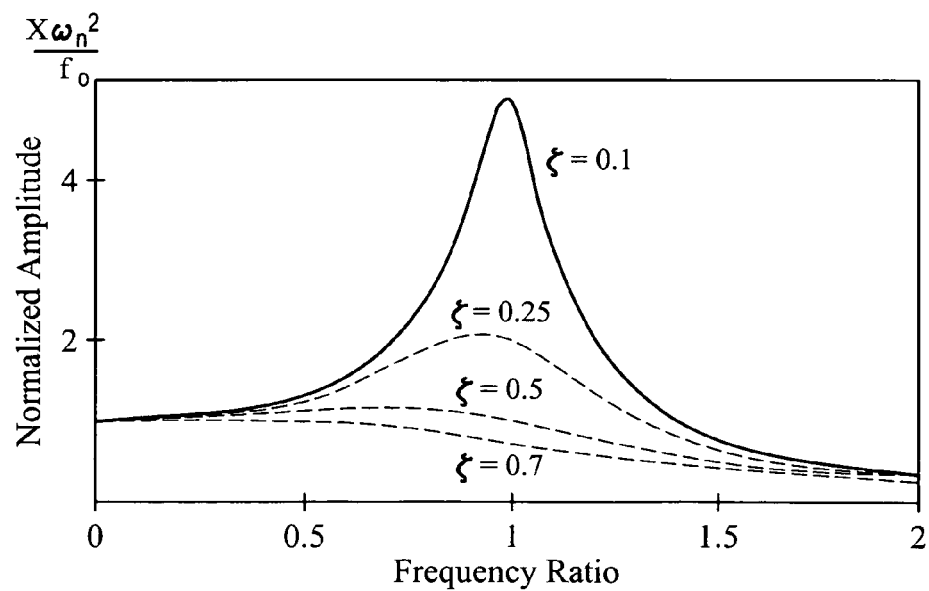
FIG. 4 is a plot of the normalized magnitude frequency ratio $(X\omega_n^2/f_o)$ of a damped system versus the frequency ratio for several different values of the damping ratio ($\zeta$) in accordance with an illustrative embodiment of the invention.

Referring to FIG. 4, a plot is presented of the normalized magnitude frequency ratio $(X\omega_n^2/f_o)$ of a damped system versus the frequency ratio for several different values of the damping ratio ($\zeta$). As the damping ratio increases, the system's efficiency to absorb energy is minimized. However, if the damping value goes to zero, then the system is not able to absorb any energy. Thus, for maximum energy dissipation an appropriate material damping value is preferably established at a calculated value.

In an illustrative embodiment of the invention, masses 2 are applied at strategic locations which are located on the anti-nodes of underlying structure 5. An anti-node is defined as a point of maximum deflection over a region of underlying structure 5. Underlying structures may have many mode shapes, which are resonant conditions for a continuous system. The mode shapes may be found by means of mathematical modeling, exact solution of the resulting partial differential equation(s) of motion, discrete finite element modeling, solution of the resulting large array of second-order differential equations, energy methods and/or the joining together of solutions corresponding to subsets of the total oscillating system. Direct measurements of the oscillating system may be obtained by using thermo-vibrometry, laser vibrometry, an array of accelerometers, thermography, sonar, strain sensors, displacement and velocity sensors, etc. These mode shapes have one or many different anti-nodes, which are optimal locations for means for absorbing sound energy.

Referring to FIGS. 5A and 5B, the first two mode shapes are presented for an 18-inch by 12-inch by 1/16-inch steel plate. The first two mode shapes occur at 114 and 176 Hz, respectively. The first mode shape contains only one anti-node at the center of the plate; however, the second mode shape has two anti-nodes, 180 degrees out of phase from each other.

In an illustrative embodiment of the invention, the first anti-node requires resonant absorber 2 that is tuned to resonate at nominally 114 Hz, while the other two anti-nodes require two resonant absorbers 2 tuned at 176 Hz, as shown in FIG. 5C. Each resonant absorber 2 may be "tuned" using one or more of the following methods: (1) changing the density, shape, size, and orientation of each of the masses 2; (2) changing the sprayed material 4 by adding foaming agents, adding other additives for alloy purposes, strength and stiffness as well as flame retardance or changing the foam cell size; (3) placing masses near each other to create a multi-frequency vibration absorber; and/or (4) spraying multiple layers of different sprayed materials 4.

Adding and mixing a sodium bicarbonate foaming agent to the spray material prior to its being sprayed through the applicator gun results in a foam with a material damping coefficient twice as small as that of the un-foamed polymer. The damping coefficient is equivalent to the material property tan 6, which is the ratio of the loss modulus to the storage modulus. The use of the blowing agent with the thermal spray application allows for the tuning of the polymer properties as they relate to acoustic absorption. For example, fully dense Escorene Ultra EVA 723.28 has a tan 6=0.07. This same polymer combined with 10 wt % sodium bicarbonate and thermally sprayed to form a foam has a tan $\delta$=0.035 when measured at 20 Hz and room temperature using dynamic mechanical analysis. In general, reducing the weight fraction of blowing agent lowers the foam bubble size and increases the foam density while increasing the blowing agent weight fraction increases the resulting bubble size and reduces the foam density.

These variables either affect the resonant frequency and/or the absorption properties of the resonant absorbers 2. Tuning is performed so that absorption of sound can take place. Designing resonators 2 to resonate at the anti-node frequency alone does not guarantee optimal sound absorption. By tuning masses 2 to have an impedance that is the same as or similar to that of underlying structure 5, energy absorption is maximized. By tuning the resonant absorbers 2 and placing them at the anti-node locations of underlying structure 5, peak sound absorption can be obtained.

Figure 6:
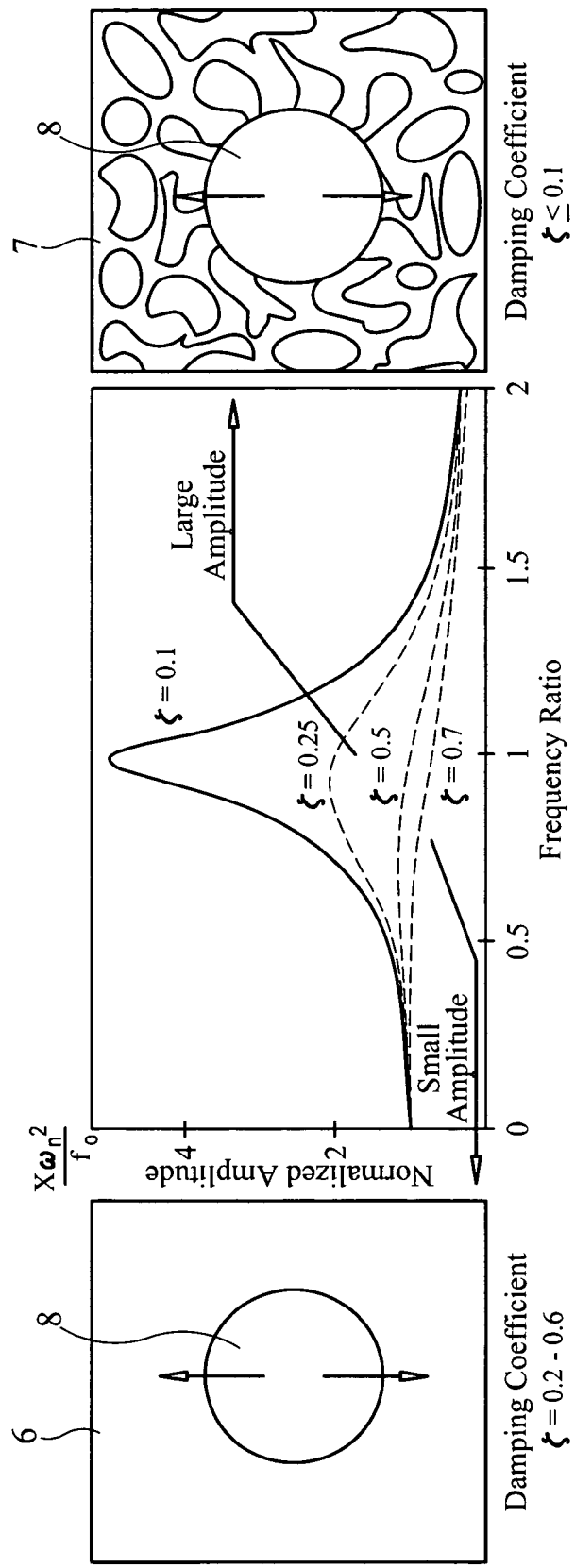
FIG. 6 is a comparative schematic illustration of amplitude of a discrete mass absorber, e.g., a metal ball, embedded within a fully dense polymer matrix versus a porous matrix made out of the same material in accordance with an illustrative embodiment of the invention.

Using foams, both closed- and open-celled, the effective spring and damping properties of sprayed material 4 may be drastically changed, as shown in FIG. 6. In this figure, fully dense polymer matrix 6 has a damping coefficient in the range of 0.2 to 0.6 and sprayed-on polymer foam matrix 7 has a damping coefficient of about 0.1. In this embodiment of the invention, fully dense polymer matrix 6 produces a small amplitude oscillation of metal ball 8 and sprayed-on polymer foam matrix 7 produces a large amplitude oscillation of metal ball 8. Tuning (varying) the bubble (void) sizes by using different blowing agents and/or by varying the particle size of both the blowing agent(s) and the thermally sprayed material 4 allows the operator to achieve the foam void size necessary to produce the needed elastic and absorption properties. Heating of the elastic material as it elastically deforms, allows it to absorb the acoustic energy.

Figure 7:
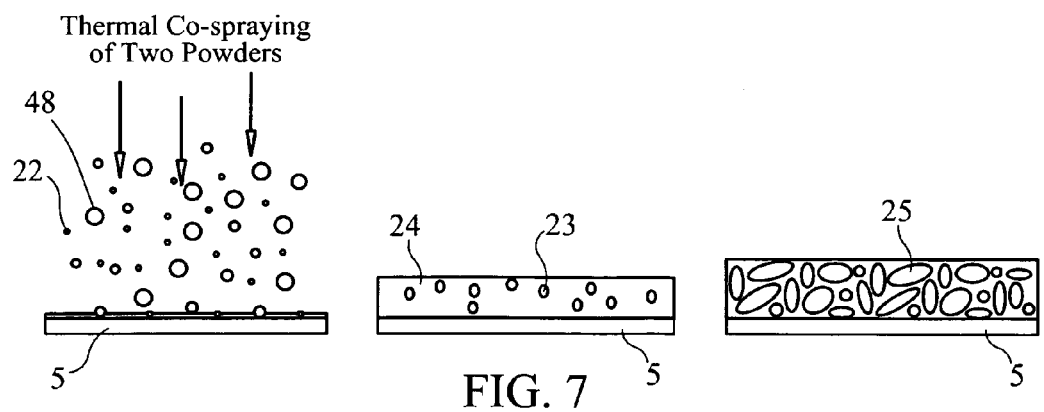
FIG. 7 is a schematic diagram illustrating steps in a methodology for in-situ formation of a thick, closed-cell foam using EVA-based elastomeric polymers.

Referring to FIG. 7, an illustrative embodiment of the invention involves thermal co-spraying of two powders, polymer powder 48 and blowing agent powder 22, e.g., a sodium bicarbonate powder, onto underlying structure 5. Thermal decomposition of blowing agent powder 22 produces solid-to-gas starts 23 in molten polymer 24. Generated carbon dioxide gas 25 expands in molten polymer 24 to form a closed cell foam.

Figure 8:
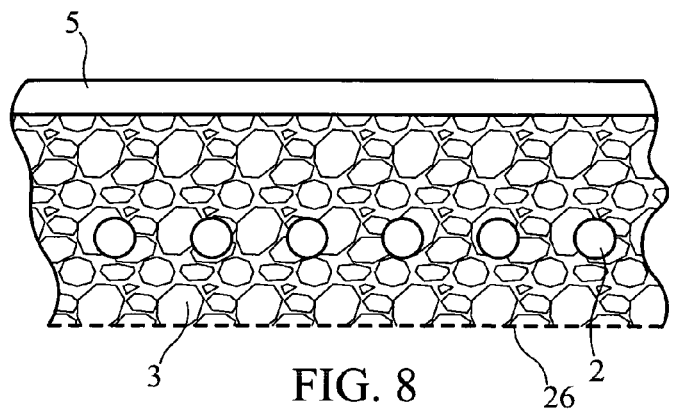
FIG. 8 is a schematic cross-sectional view of a thermal sprayed material with a perforated fiberglass cover in accordance with an illustrative embodiment of the invention.
Figures 9A, 9B, 9C, 9D:
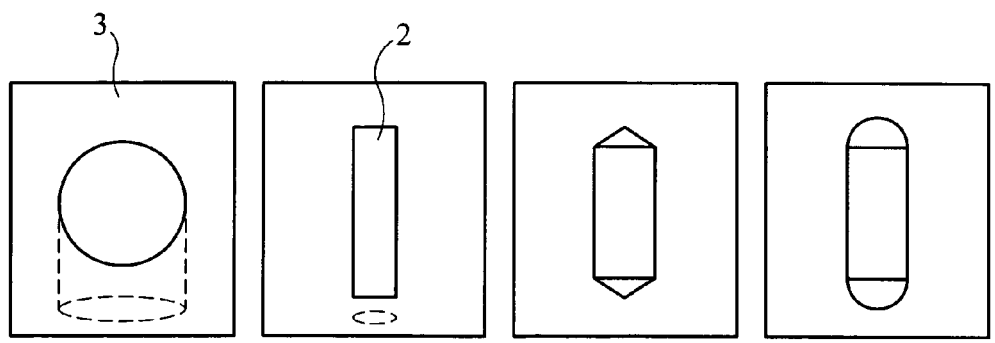
FIGS. 9A-9D are schematic elevation views of examples of different shapes of embedded discrete mass absorbers in accordance with illustrative embodiments of the invention.

In another illustrative embodiment, cover 26 (e.g., a perforated cover) is applied to polymer matrix 3 (e.g., an initial spray coating) in the form of another spray coating, a compliant member comprised of a material like rubber or silicone, or a rigid member, as displayed in FIG. 8. The rigid member may be comprised of one or more metals, ceramics, fiberglass, or other rigid materials which may be selected for its fire suppression, insulation or sound absorbing qualities.

Figure 10:
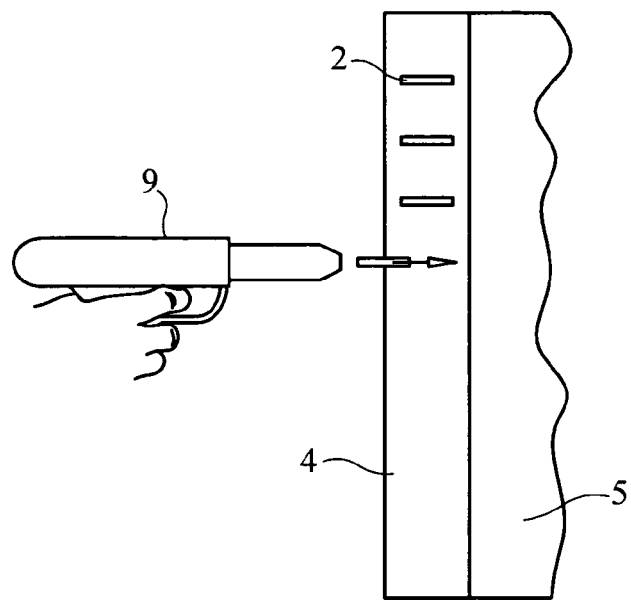
FIG. 10 is a schematic elevation view illustrating a concept for rapid embedding of cylindrical mass absorbers into a sprayed-on viscoelastic foam in accordance with an illustrative embodiment of the invention.

Different shapes of the embedded masses greatly affect the resonant frequency of tuned mass resonators 2. Samples of illustrative shapes are displayed in FIGS. 9A-9D. These embedded masses 2 may also be placed into sprayed material 4 after the material has been applied by pneumatic placement gun 9, by hand, or by other mechanical means, as shown in FIG. 10.

WORKING EXAMPLES

Figure 11:
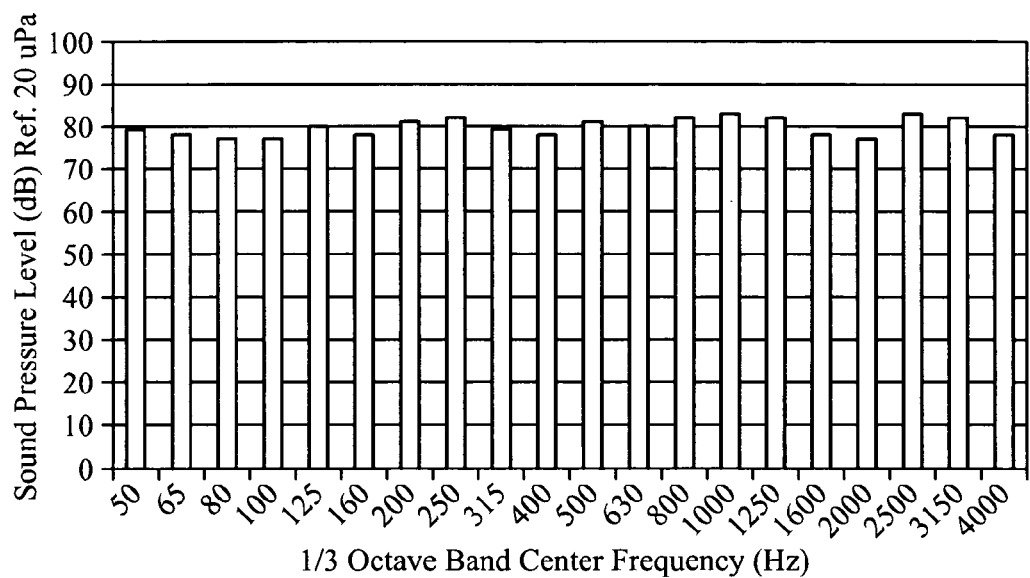
FIG. 11 is a chart showing sound pressure levels in a reverberation chamber
Figure 12A:
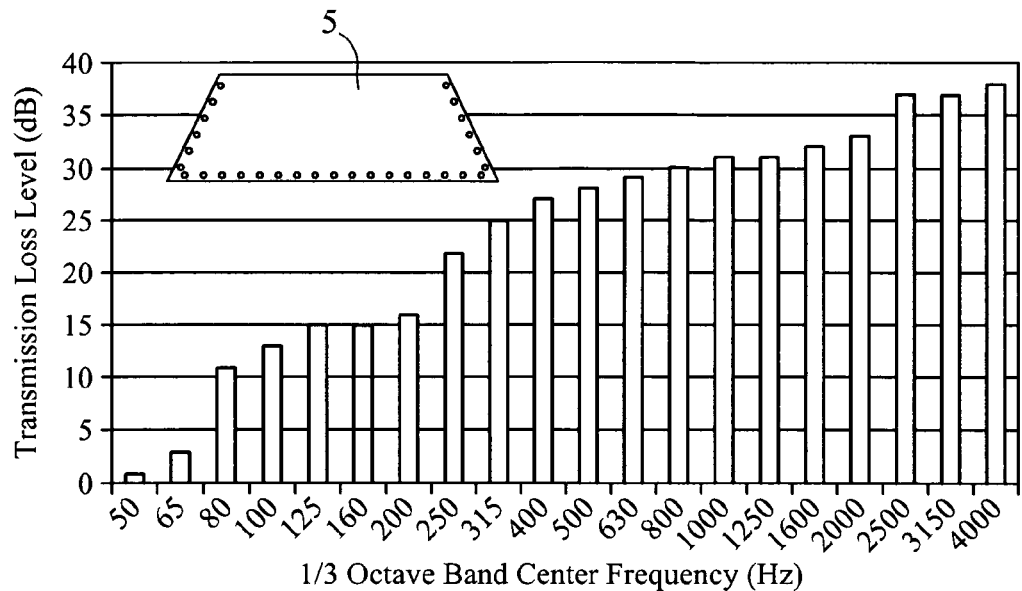
FIG. 12A is a chart showing the transmission loss of an untreated steel plate with dimensions 18 inches by 12 inches by 1/16 inch.
Figure 12B:
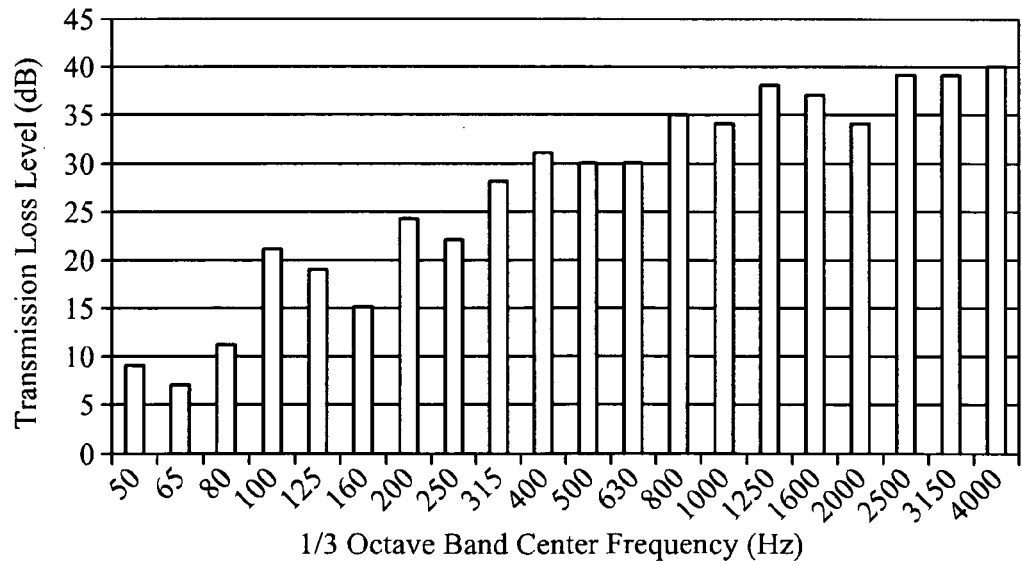
FIG. 12B is a chart showing the transmission loss of the same plate with attached MIL-PRF-24699A Class III acoustic treatment.

To demonstrate the amount of sound absorption that illustrative embodiments of acoustic insulation 1 can achieve, a reverberation chamber was used to generate test data. The sound pressure level in the reverberation chamber was nominally 80 decibels (dB) over the entire frequency spectrum, as shown in FIG. 11. All of the sound transmission loss tests were performed using standard 18-inch by 12-inch by X $\frac{1}{16}$-inch steel plates as the underlying structure 5. For an untreated steel plate tested in the chamber, sound transmission losses (STL) were less than 16 dB for frequencies below 200 Hz, as shown in FIG. 12A. A similar steel plate with a MIL-PRF-24699A Class III acoustic treatment achieved less than 25 dB of STL for frequencies below 250 Hz, as shown in FIG. 12B.

Figure 13:
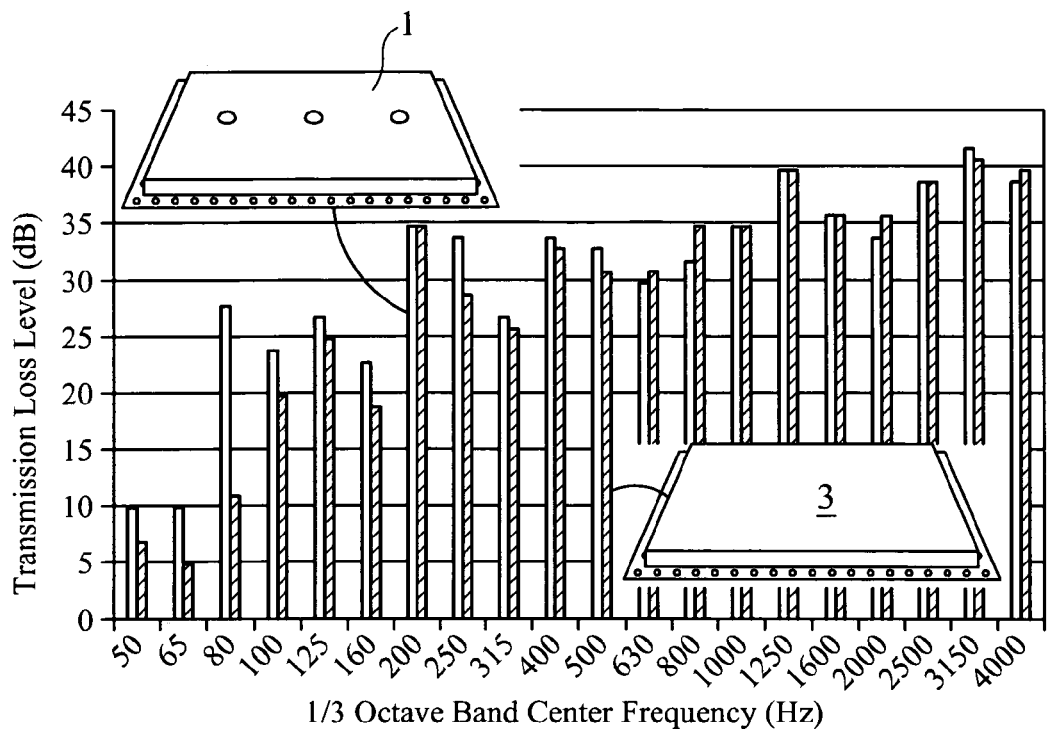
FIG. 13 is a chart showing a transmission loss comparison between a one inch thick spray-on treatment with embedded masses in accordance with an illustrative embodiment of the invention and the one-inch thick spray-on treatment without masses.
Figure 14:
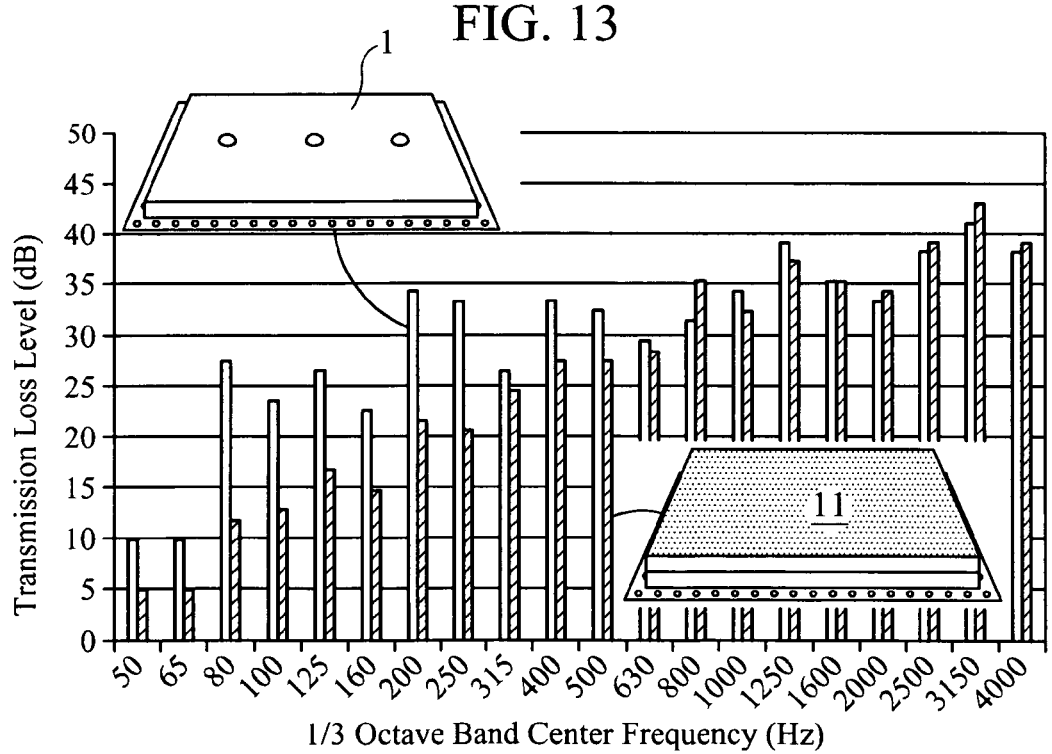
FIG. 14 is a chart showing transmission loss comparison between a one inch thick spray-on treatment in accordance with an illustrative embodiment of the invention and a 4.25-inch thick background art treatment being used in some U.S. Navy installations.

By using the sprayed-on acoustic treatment 1 with and without embedded masses 2, the STL were increased up to 35 dB for frequencies below 250 Hz, as shown in FIG. 13. A sprayed-on embodiment of the invention comprising embedded masses 2 raised the sound transmission losses over the specific frequency range of 114 and 176 Hz as predicted. Thermal spray treatment 1 with embedded masses 2 was also compared with a background art U.S. Navy treatment 11, as shown in FIG. 14, and over double the STL were achieved for particular frequency ranges below 250 Hz.

Figure 15A:
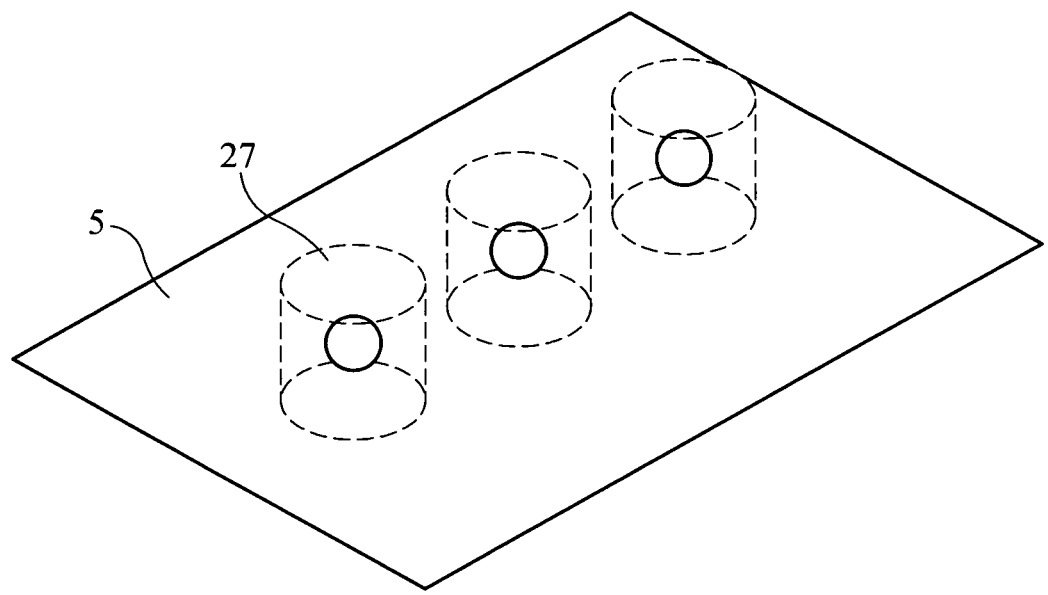
FIG. 15A is a schematic perspective view illustrating a model of a discrete acoustic treatment of a viscoelastic matrix with embedded masses on an 18-inch by 12-inch by 1/16-inch steel plate underlying structure in accordance with an illustrative embodiment of the invention.
Figure 15B:
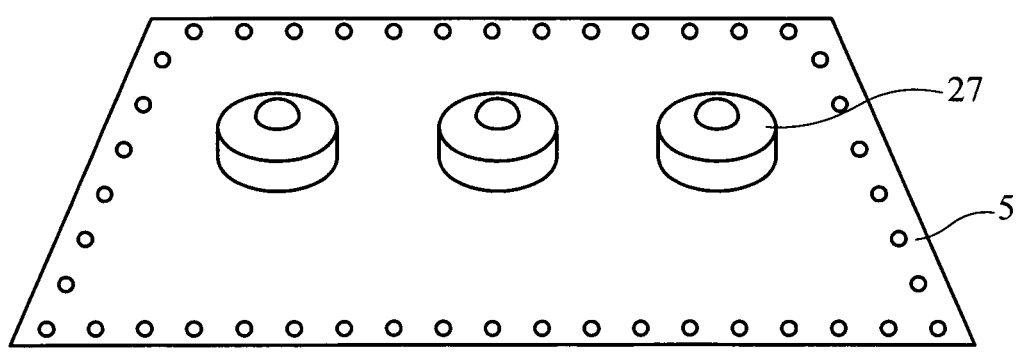
FIG. 15B is a schematic perspective view of a similar plate with three discrete acoustic absorbers that was evaluated using transmittance loss testing.
Figure 16:
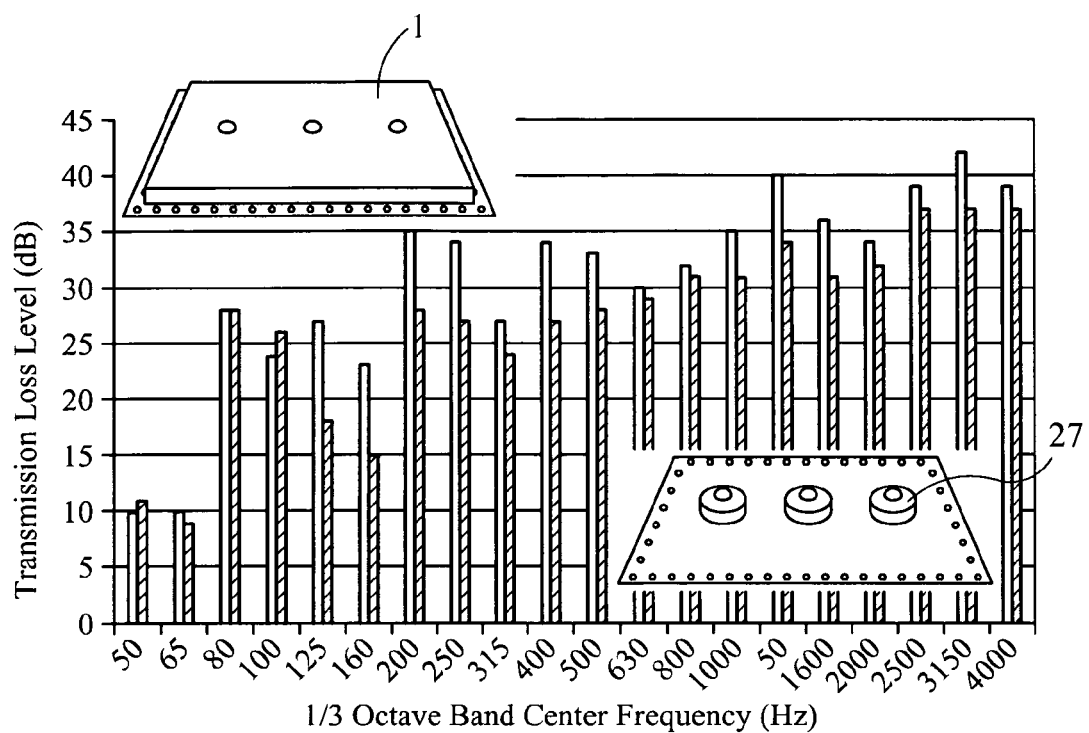
FIG. 16 is a chart showing a transmission loss comparison between a continuous spray-on treatment and a discrete treatment, both based on a viscoelastic matrix with embedded masses on 18 inch by 12 inch by 1/16 inch steel plate.

Placing masses 2 at the anti-nodes can also be accomplished with discrete mass absorbers 27, displayed in FIGS. 15A and 15B. A comparison between the fully sprayed-on acoustic insulation 1 and an acoustic insulation treatment comprising discrete mass absorbers 27 is presented in FIG. 16. The discrete absorbers 27 absorbed the same amount of sound as the sprayed-on acoustic treatment 1 for frequencies of 100 Hz and less. The three discrete mass absorbers 27 in this figure were designed for the 80 Hz frequency range.

Figure 17:
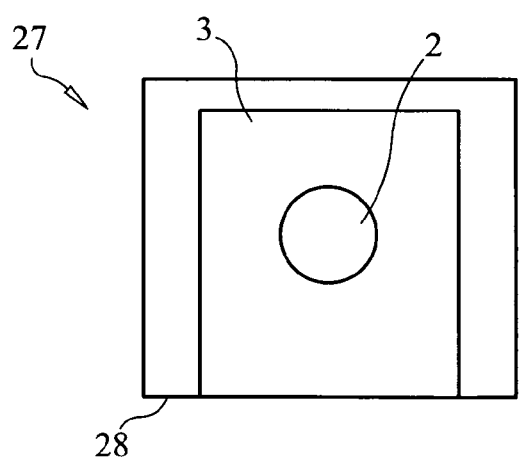
FIG. 17 is a schematic cross-sectional view of a hermetically sealed discrete absorber in accordance with an illustrative embodiment of the invention.

For commercial applications, each of the discrete mass absorbers 27 may be hermetically sealed in cylindrical housing 28, as illustrated in FIG. 17. By hermetically sealing the discrete mass absorbers 27, they may be made to be fire proof for naval applications as well as water tight and weather proof for use in any outdoor environment. Housing 28 does not have to be hermetically sealed, and functions without being sealed. Thus, housing 28 may also be installed without being sealed.

Figure 18:
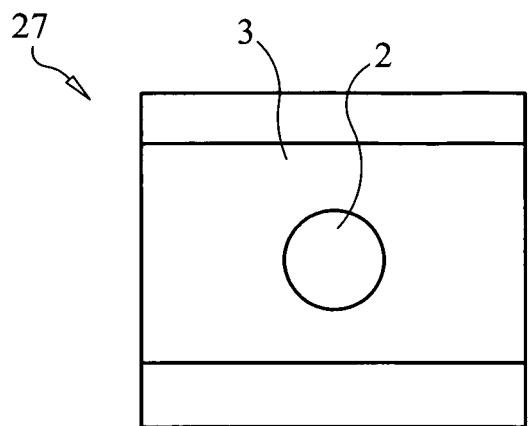
FIG. 18 is a schematic cross-sectional view of a discrete absorber with a viscoelastic layer mounted in a shear mode in accordance with an illustrative embodiment of the invention.

In illustrative embodiments of the invention, many different configurations of discrete resonant absorbers 27 may be used. Configurations using sprayed viscoelastic materials, preformed open and closed cell foams, preformed sheets of viscoelastic materials, as well as blown in or expanded in configurations are envisioned by the applicants. The viscoelastic material may be mounted on a single side of housing 28 or on both sides. The orientation of the mounting may also change depending on whether the viscoelastic material is designed to act as a spring in the axial direction or in the shear direction, similar to a cantilever beam, as shown in FIG. 18. The housing may be provided in all shapes and sizes. A typical shape is a cylinder; however, spheres, rectangles, cubes, pyramids, etc. may be used.

Figure 19:
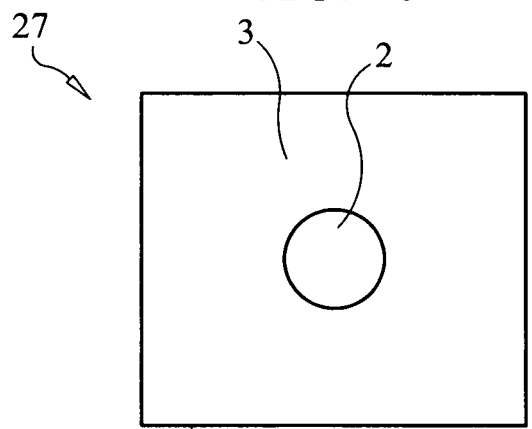
FIG. 19 is a schematic cross-sectional view of a discrete absorber with a viscoelastic layer completely filling a housing in accordance with an illustrative embodiment of the invention.
Figure 20:
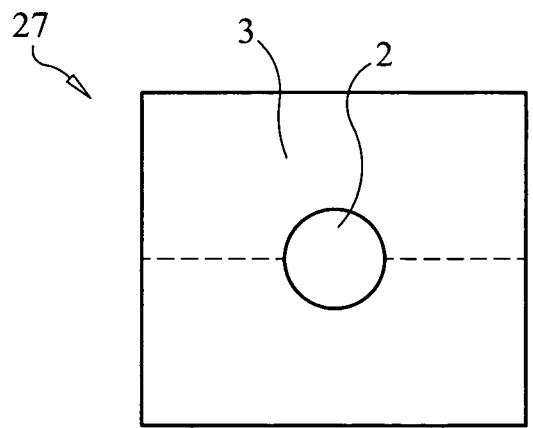
FIG. 20 is a schematic cross-sectional view of a discrete absorber with two sections that are formed into one section, which are made from pre-fabricated sections in accordance with an illustrative embodiment of the invention.
Figure 21:
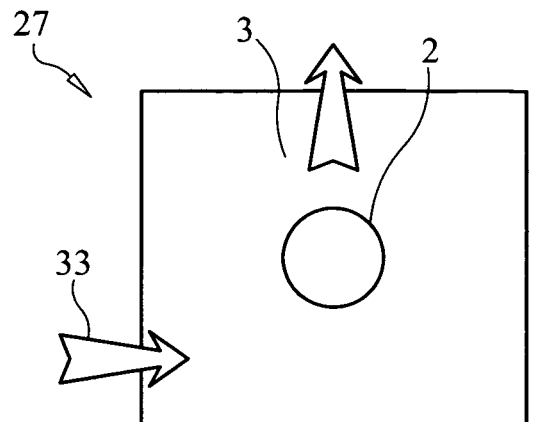
FIG. 21 is a schematic cross-sectional view of a discrete absorber showing that a housing can be used as a form into which to inject a viscoelastic material in accordance with an illustrative embodiment of the invention.
Figure 22:
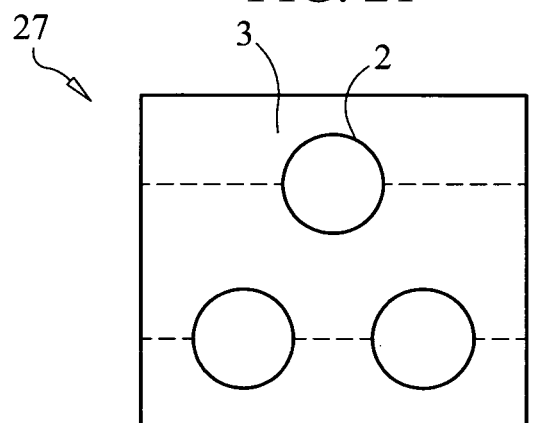
FIG. 22 is a schematic cross-sectional view of a discrete absorber with a plurality of layers and a plurality of discrete masses in each layer in accordance with an illustrative embodiment of the invention.
Figure 23:
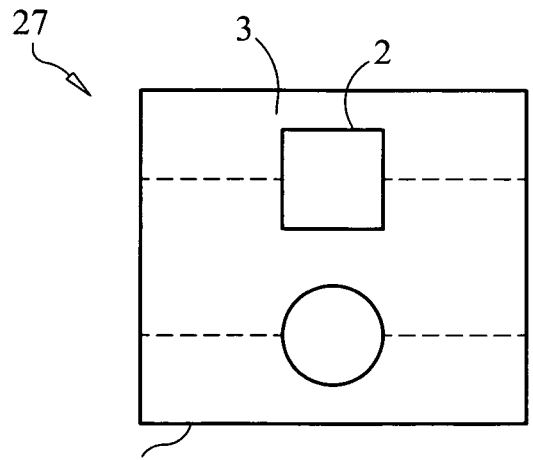
FIG. 23 is a schematic cross-sectional view of a discrete absorber with different shapes of discrete masses in accordance with an illustrative embodiment of the invention.

In another illustrative embodiment, the entire enclosed volume of housing 28 may be filled, as shown in FIG. 19. The polymer matrix 3 may also be assembled as two or more preformed materials, as shown in FIG. 20. The fill material may be filled, blown, sprayed or injected assembled into housing 28 via port 33, as shown in FIG. 21. One or more vents 29 may also be provided. There may be one or more layers of polymer matrix 3 and one or more masses per layer, as shown in FIG. 22. Each layer may have different material properties, and each section between the layers of polymer matrix 3 may be comprised of a different material or materials having different properties. A plurality of different masses sizes, shapes, orientations and densities may also be used, as shown in FIG. 23.

Coupling discrete mass absorbers 27 with a sprayed-on acoustic treatment allows the treatment of a broad range of frequencies, e.g., low frequencies with discrete mass absorbers 27 and higher frequencies with a sprayed-on embodiment of acoustic insulation 1. In an illustrative embodiment, the use of discrete mass absorbers 27 allows the replacement of the heavy, massive insulation typically used in the background art to dampen low frequency sound energy. Thus, the active acoustic damping provided by discrete mass absorbers 27 saves weight. Weight savings are important for acoustic insulation applications on ships, aircraft and other transportation equipment.

Figure 24:
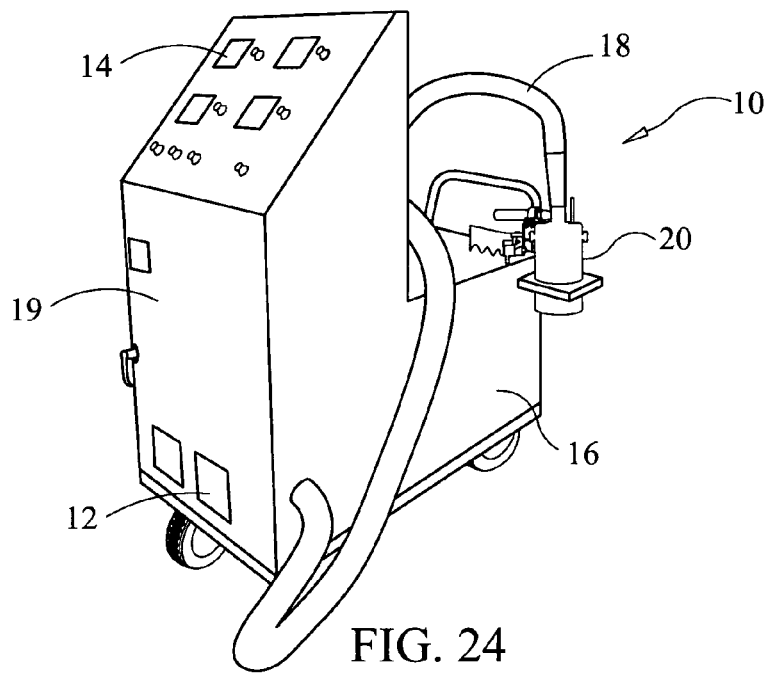
FIG. 24 is a perspective view of an embodiment of a thermal spray system in accordance with an illustrative embodiment of the invention.

Referring to FIG. 24, an illustrative embodiment of a thermal spray system 10 that may be used to install acoustic insulation 1 is presented. In this embodiment, thermal spray system 10 is a self-contained, field-deployable thermal spray system. System 10 comprises five distinct yet integrated operating segments: on-board power distribution segment 12, control panel segment 14, powder bin segment 16, umbilical hose segment 18 and spray gun segment 20. In an illustrative embodiment, segments 12, 14 and 16 are incorporated into cart 19.

When supplied with 480-volt single-phase power, power distribution segment 12 utilizes transformers to provide 240-volt, 120-volt AC power as well as 24-volt DC power to the rest of system 10. Control panel segment 14 provides the operator of system 10 control of the power to the various heaters, temperature control of the various heaters, flow control of the carrier gas, selection of the type of carrier gas used, as well as on/off control of the vibrator attached to the powder bin segment 16. Insulated, heated umbilical hose segment 18 conveys preheated mixture 56 of powder 48 and carrier gas 40 to spray gun segment 20. An illustrative embodiment of system 10 has the following features: 2,500 watts of radiant/convective heat; special radiant/convection heating to provide radiation and forced convection heat transfer with a slip stream of hot gas that keeps the interior of the heating zone clean of debris; a radiant/convective heating zone temperature of 650° C.; NiCr or FeCrAl heating elements; a portable system (less than 2.7 kg) with a two or three meter umbilical hose; a heat shielded grip with a high cycle switch; a positive 70 kV of electrostatic charge for increased transfer efficiency; a self-contained heat shielded corona electrode; a cooled nozzle tip to prevent tip fouling; a Delrin® gun body construction for electrical insulation and thermal resistance; an aluminum radiant shroud and plenum for durability and light weight; and an enclosed barrel housing for cool operation and complete housing of wires and tubing.

Figure 25:
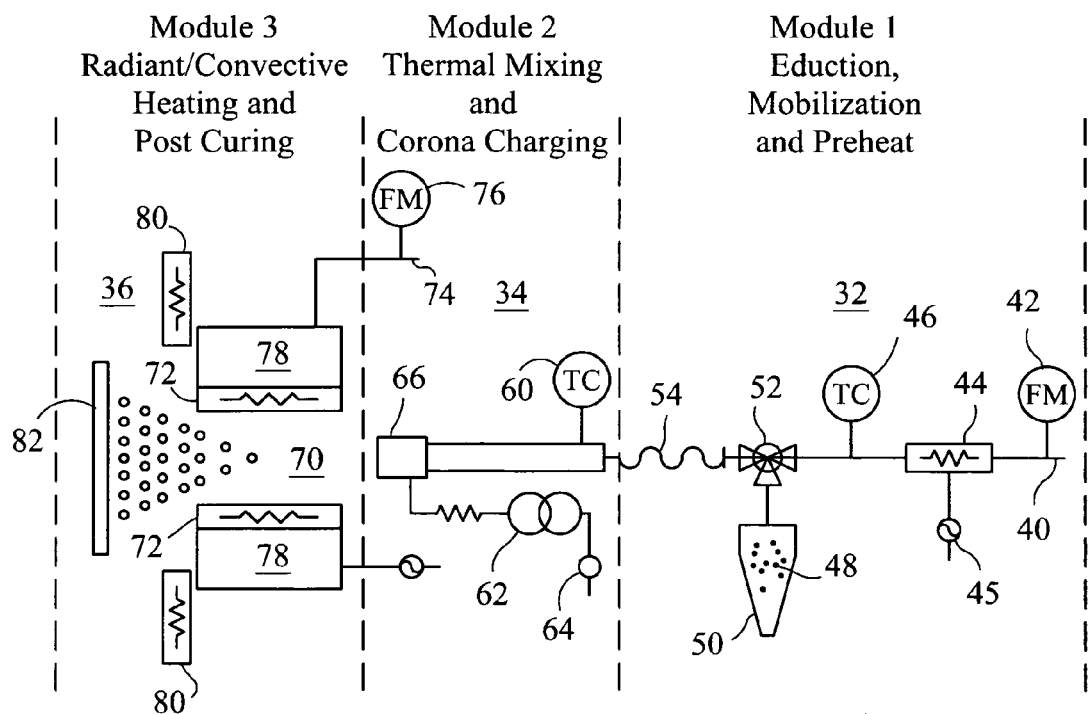
FIG. 25 is a process flow diagram illustrating the operating principles of an illustrative embodiment of the invention.

Referring to FIG. 25, a schematic process flow diagram illustrates the operating principles of an illustrative embodiment of the thermal spray system 10. From an operating perspective, this embodiment comprises three operational modules.

First module 32 provides powdered polymer education, mobilization and preheating. The flow rate of carrier gas 40 is measured by carrier gas flow meter 42 and the temperature of carrier gas 40 is raised by carrier gas inline heater 44 that is controlled by carrier gas temperature controller 45 and measured by carrier gas thermocouple 46 (which is preferably a Type K thermocouple). In an illustrative embodiment, a 1,000-watt high velocity inline gas (e.g., air) heater from Farnam Custom Products is used. Powder 48 is fluidized in material reservoir 50 and drawn into eductor 52 where it is mixed with carrier gas 40. Mixture 56 of carrier gas 40 and powder 48 is further heated in heated/insulated umbilical hose 54. Carrier gas 40 is preferably air or nitrogen or any other non-flammable gas. High-temperature silicone insulation is used to limit heat losses from the conveyed particles and the conveying gas. A 12 mm thick silicone insulation is used to compensate for heating losses during powder transport.

In second module 34, the particles of powder 48 in mixture 56 undergo thermal mixing and corona charging to induce a strong electrostatic charge on powder 48. The temperature of mixture 56 is measured by mixture thermocouple 60. A charge is placed on powder 48 by a corona tip (not shown) that is in turn charged by voltage cascade 62 which is controlled by DC control 64. In an illustrative embodiment, corona charging of powder 40 occurs prior to discharge of the mixture through nozzle 66. In an alternative embodiment, corona charging occurs at or after mixture 56 leaves nozzle 66. To avoid saltation in the radiant heat zone, a 7 mm port size is used on nozzle 66. Adding a chamber to this port reduces turbulence and provided a more controlled powder stream.

In third module 36, powder 48 is brought to molten temperatures by radiant and convective heating in radiant/convective heating zone 70. Radiant/convective heating zone 70 is heated by heating zone heater 72. An illustrative configuration for radiant/convective heating zone 70 is a cylindrical shape with a length to diameter ratio that is preferably about 1.5:1 but that may be in the range from about 1:2 to about 3:1. In an illustrative embodiment, convective heating gas 74 is metered into radiant/convective heating zone 70 by convective heating gas flow meter 76 and heated in convective/radiant annulus 78. Hot convective heating gas 74 is exhausted from the nozzle end of radiant/convective heating zone 70 which also heats powder 48. The maximum obtainable watt density was about 9 watts/square centimeter. A Kanthal FeCrAl—Al heating element is preferred, which typically produces a higher element temperature than less preferred embodiments that used nickel-chromium alloy. Zircar Z-500 is preferred for the radiant end caps due to its low density, ease of machining, and high thermal resistance. Fiberfrax insulation is preferred in the region between the heating elements and the radiant shroud. The radiant shroud is preferably made from aluminum due to its light weight. In an alternative embodiment, radiant panels 80 and convective/radiant annulus 78 can also be used to heat substrate 82. In an illustrative embodiment, each of the radiant panels 80 supplies about 2,500 watts of radiant heat with at a temperature of about 1100° C. An illustrative substrate temperature for polyimide spraying is between 250 and 300° C.

Figure 26:
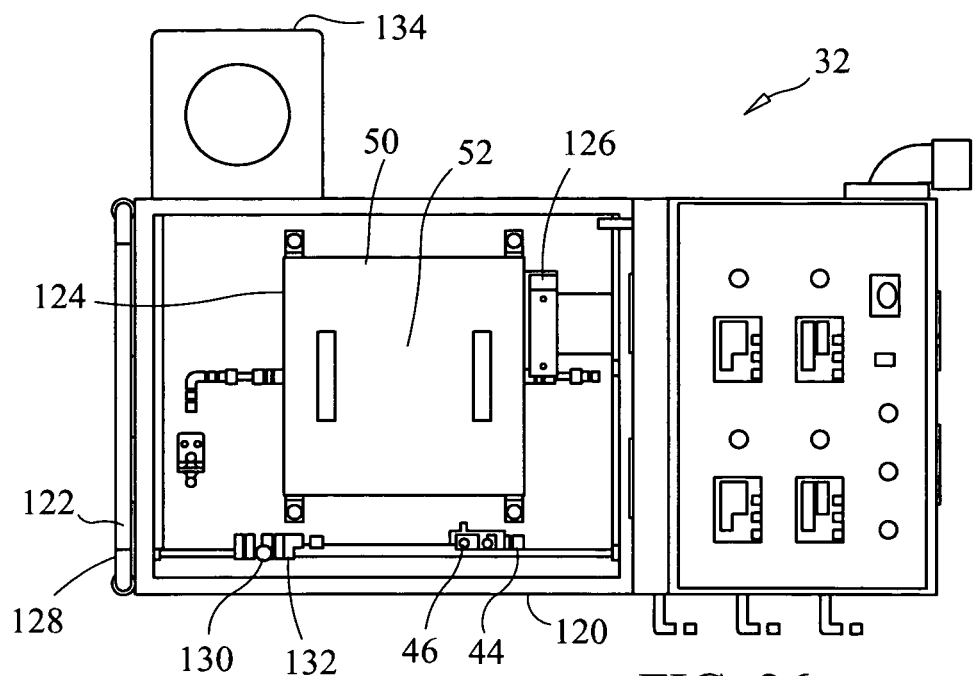
FIG. 26 is a plan view of the powder particle mobilization, heating, and transportation portion of an illustrative embodiment the invention.

Referring to FIG. 26, the components of first module 32 of an illustrative embodiment of system 10 are presented. Cart assembly 120 has input power cord receptacle 122 located at the rear of the cart. Located inside cart assembly 120, powder bin 124 comprises of supply hopper 50 with attached hopper vibrator 126. FIG. 3 also depicts the location of multiple carrier gas inlets 128. In an illustrative embodiment, compressed, dry, oil-free plant air is used as carrier gas 40 and in an alternative embodiment compressed dry nitrogen is used as an additional carrier gas 40. Other carrier gases may also be used. The two carrier gasses meet at carrier gas selection solenoid 130. The selection of the carrier gas is accomplished with the carrier gas selection switch found on the control console. Downstream of the solenoid 130 the chosen carrier gas flow rate is obtained with a flow meter. Further downstream, carrier gas inline heater 44 heats the carrier gas prior to entraining the polymer powder. Carrier gas feedback thermocouple 46 is located adjacent to carrier gas inline heater 44 and serves to provide feed-back to the carrier gas temperature controller (not shown). The heated carrier gas then flows through eductor 52 which is located inside powder bin 124. Eductor 52 is situated at the bottom of supply hopper 50. The vacuum created by eductor 52 draws powdered polymer foam constituents into the carrier gas stream and mixture 56 is transported into umbilical hose 54 and out to spray gun nozzle 66. Bypass solenoid 132 is located just upstream from in-line eductor 52. Solenoid 132 routes carrier gas 40 either through in-line eductor 52 in hopper 50 or routes carrier gas 40 around hopper 50. Bypass solenoid 132 is activated by the trigger on spray gun 20. The use of the by-pass arrangement ensures a constant flow of gas through the flow tip. Thus, the flow that exits spray gun nozzle 66 contains entrained polymer only when the trigger is depressed. Spray gun holder 134 provides a place to store spray gun 20 when it is not in use.

Figure 27:
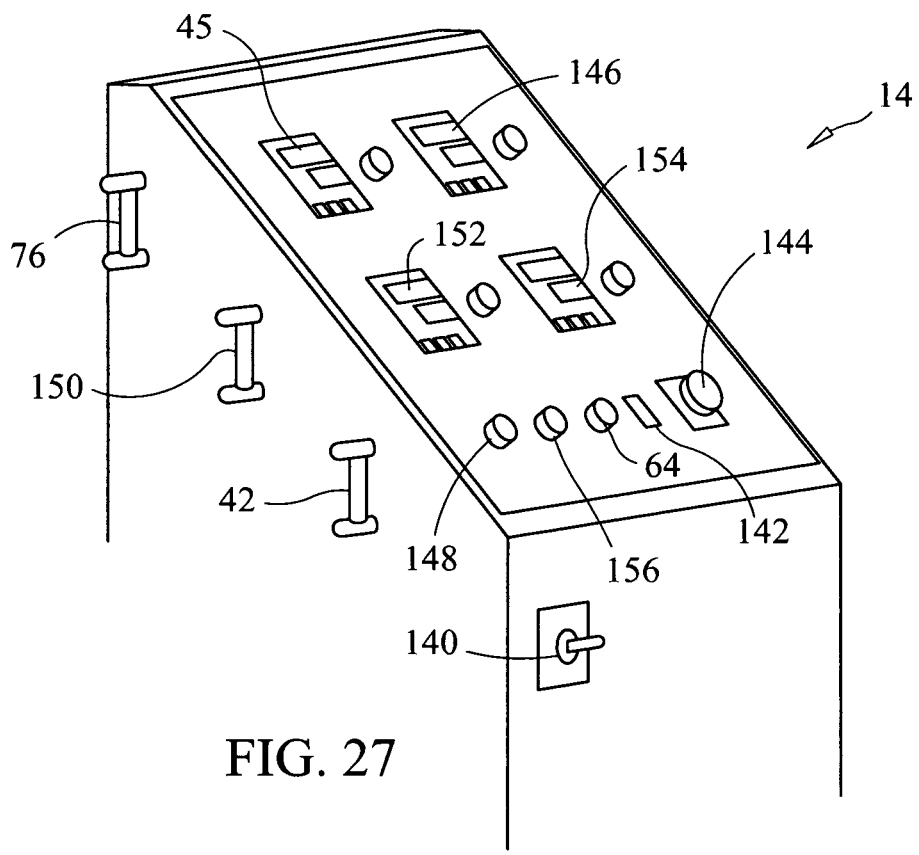
FIG. 27 is a perspective view of the control panel of an illustrative embodiment of the invention.

Referring to FIG. 27, control panel 14 comprises the process controls for an illustrative embodiment of thermal spray system 10. Power to system 10 is controlled by main power switch 140. The carrier gas is chosen with carrier gas selection switch 142. The carrier gas flow rate is adjusted with carrier gas flow meter 42. The temperature of carrier gas 40 is controlled with carrier gas temperature controller 45. Power to the radiant heater in spray gun 20 (heating zone heater 72) is controlled by spray gun heater controller 144 (e.g., 0-240 VAC variable voltage transformer with panel mounted on/off and level control dial). The flow of convective heating gas 74 to the spray gun is regulated with convective heating gas flow meter 76. Voltage cascade switch 64 allows the electrostatic capabilities of spray gun 20 to be enabled or disconnected by providing power to voltage cascade 62. Once enabled, the electrostatic function turns on when the spray gun trigger is engaged. Umbilical hose heater controller 146 for the umbilical hose heaters ensures the temperature increase due to preheating of polymer powder 48 is not lost during transport to the head of spray gun 20. Control panel 14 also has vibrator control switch 148 to enable or disable supply hopper vibrator 126. In an illustrative embodiment, nozzle cooling medium flow meter 150 is provided for controlling the flow rate of the nozzle cooling medium. In an illustrative embodiment, auxiliary temperature controllers 152, 154, and auxiliary activation switch 156 are also provided.

In an illustrative embodiment, system 10 is powered by 480-volt single-phase power. The primary transformer is rated at 15 kW and converts all of the incoming electrical power to 240 volts. 3 kW of the 240-volt power produced is transformed into 120 single-phase power. The 12 kW of 240 power is used to power heaters while the 120-volt power is used for controls, lights, corona power supply, solenoids, and some light duty heating applications. Safety features include lighted switches to indicate when a given item is in use, individual fuses for each component, pressure switch overrides for gas heaters, power-on beacon, and a main panel switch that prevents the thermal spray cart from being powered when the circuits are exposed.

Figure 28:
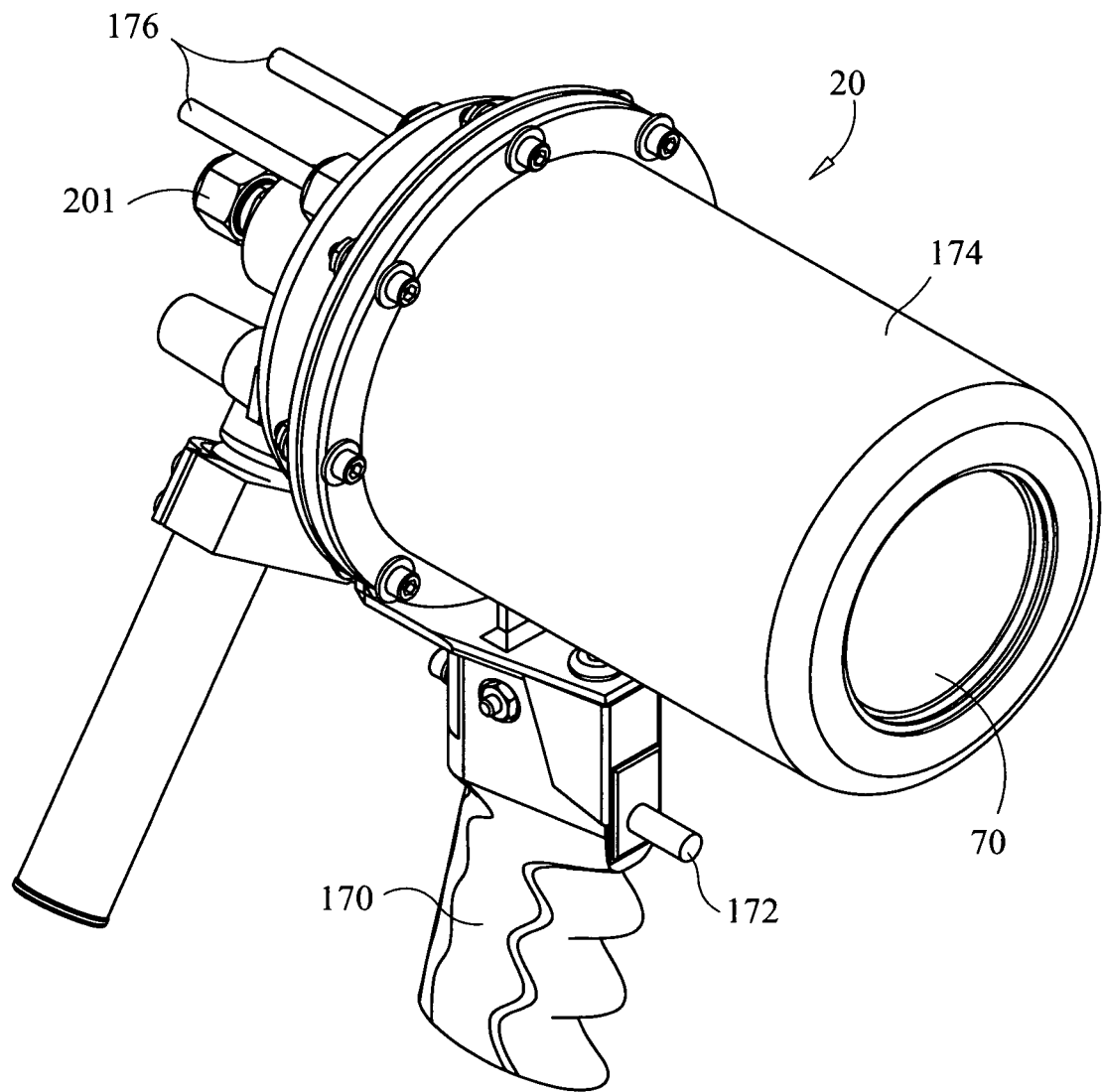
FIG. 28 is a perspective view of the thermal spray gun portion of an illustrative embodiment of the invention.

Referring to FIG. 28, thermal spray gun segment 20 of an illustrative embodiment of thermal spray system 10 is illustrated. In this embodiment, spray gun 20 is operated single-handed by an operator by holding grip 170. Depressing trigger 172 activates the education of polymer powder 48 into carrier gas stream 40. Mixture 56 carrying powder 48 enters spray gun 20 through carrier gas inlet 201. The operator is protected from heat emanating from radiant/convective heating zone 70 by radiant shroud 174. Inlet and outlet connectors 176 for the nozzle cooling media are also shown on FIG. 28.

Figure 29:
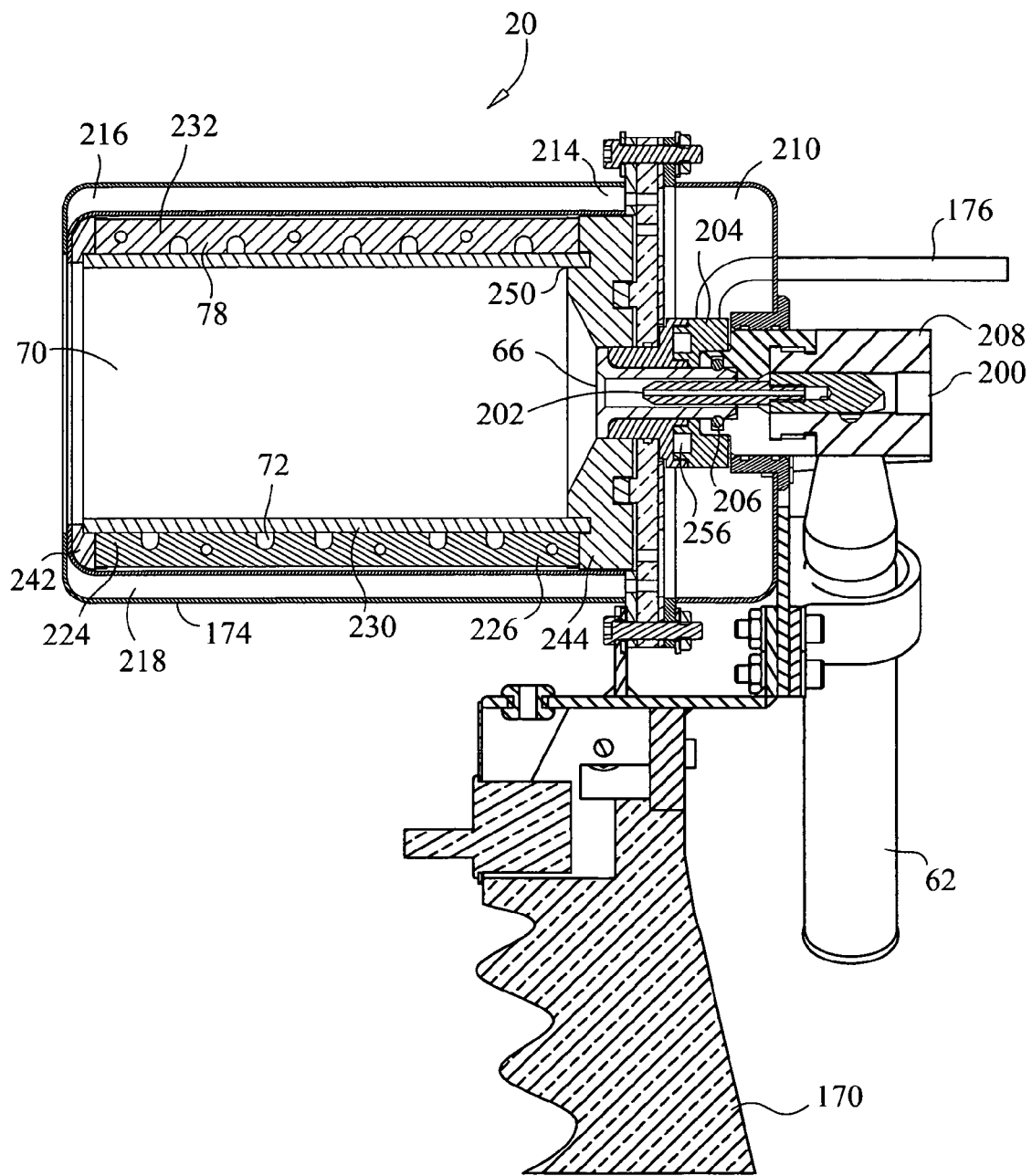
FIG. 29 is a cross-sectional view of the thermal spray gun portion of an illustrative embodiment of the invention.

Referring to FIG. 29, a cross-sectional view of thermal spray gun 20 is presented showing the details of an illustrative embodiment of the gun assembly. The mixture of powder 48 and carrier gas 40 that is conveyed through umbilical hose 54 enters the gun barrel 200 through carrier gas inlet and travels around the corona produced by corona charging tip 202. Charging tip 202 receives power from voltage cascade 62. Charging tip is inside solid ceramic spray nozzle 66 which shapes powder flow 56 as it enters radiant/convective heating zone 70. The gas or fluid that provides for nozzle cooling enters heat sink 204 via the nozzle cooling channel 256 connected to an outside source by the nozzle cooling media inlet and outlet 176 (one of which is behind the other in this view). Nozzle 66 is held in place by locking O-ring 206 between nozzle 66 and nozzle support 208. Nozzle 66 is also held in place by heat sink 204. In an illustrative embodiment, Teflon® tubing is used to convey the particles, which forms a positive tribocharge. This tribocharge is preferably utilized and enhanced by a positive source 70 kV electrode to produce a positive electrostatic charge on the conveyed particles.

The gas (convective heating gas 74) that cools radiant shroud 174 and convectively heats powder 48 carried into radiant/convective heating zone 70 first enters plenum 210 through convective heating gas inlet 212 (shown on FIG. 9). When convective heating gas 74 enters plenum 210, it is normally at room temperature. This room temperature gas flows from aft end 214 to forward end 216 of radiant shroud 174 through cooling annulus 218. This gas flow through cooling annulus 218 helps reduce the outside temperature of radiant shroud 174. Near forward end 216, gas 74 is directed to heating annulus 78. The gas 74 then flows from front end 224 to back end 226 of heating annulus 78 while passing over coiled heater elements 72. Heater elements 72 are evenly distributed around radiant core 230 and kept in place by heater element supports 232. These four supports 232 are evenly spaced around radiant core 230 and are indexed in place by slots 240 machined into the forward end cap 242 and aft end cap 244, which are preferably constructed of a low density ceramic. Once the now hot gas has reached back end 226 of heating annulus 220 it is directed through a series of orifices 250 machined in aft end cap 224. Orifices 250 direct jets of hot convective heating gas 74 from heating annulus 78 into radiant/convective heating zone 70 inside of radiant tube 230.

Figure 30:
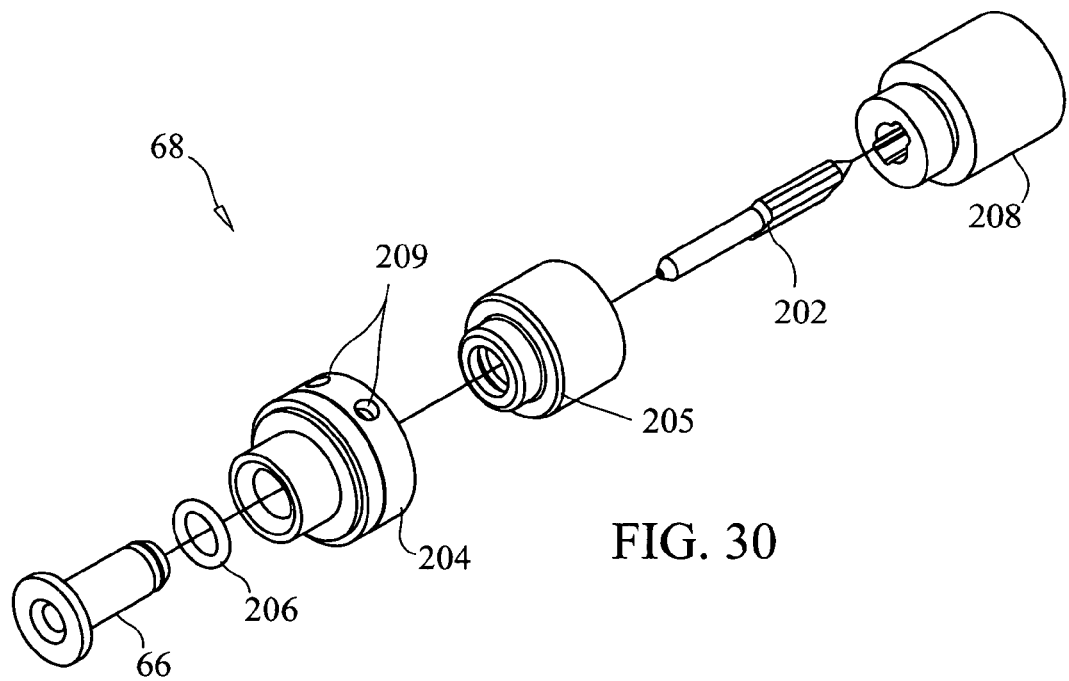
FIG. 30 is an exploded view of the nozzle portion of an illustrative embodiment of the invention.

Referring to FIG. 30, an exploded view of the components of nozzle assembly 68 of an illustrative embodiment of thermal spray system 10 is presented. Nozzle assembly 68 comprises nozzle 66, locking O-ring 206, heat sink 204, corona mount 205, charging tip 202 and nozzle support 208. Heat sink 204 has two mounting holes 209 to which inlet and outlet connectors 176 attach and by which the cooling medium enters and exits heat sink 204.

Figure 31:
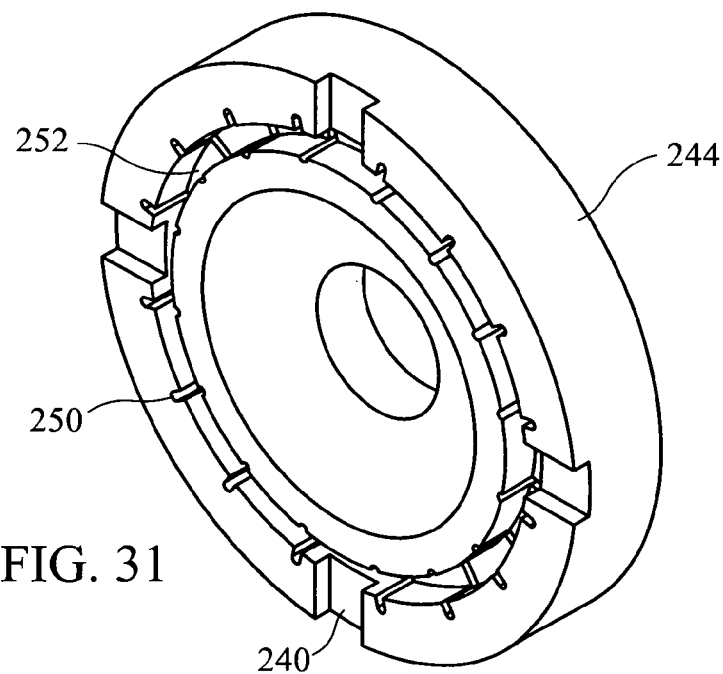
FIG. 31 is perspective view of the aft end cap inside the thermal spray gun of an illustrative embodiment of the invention.
Figure 36:
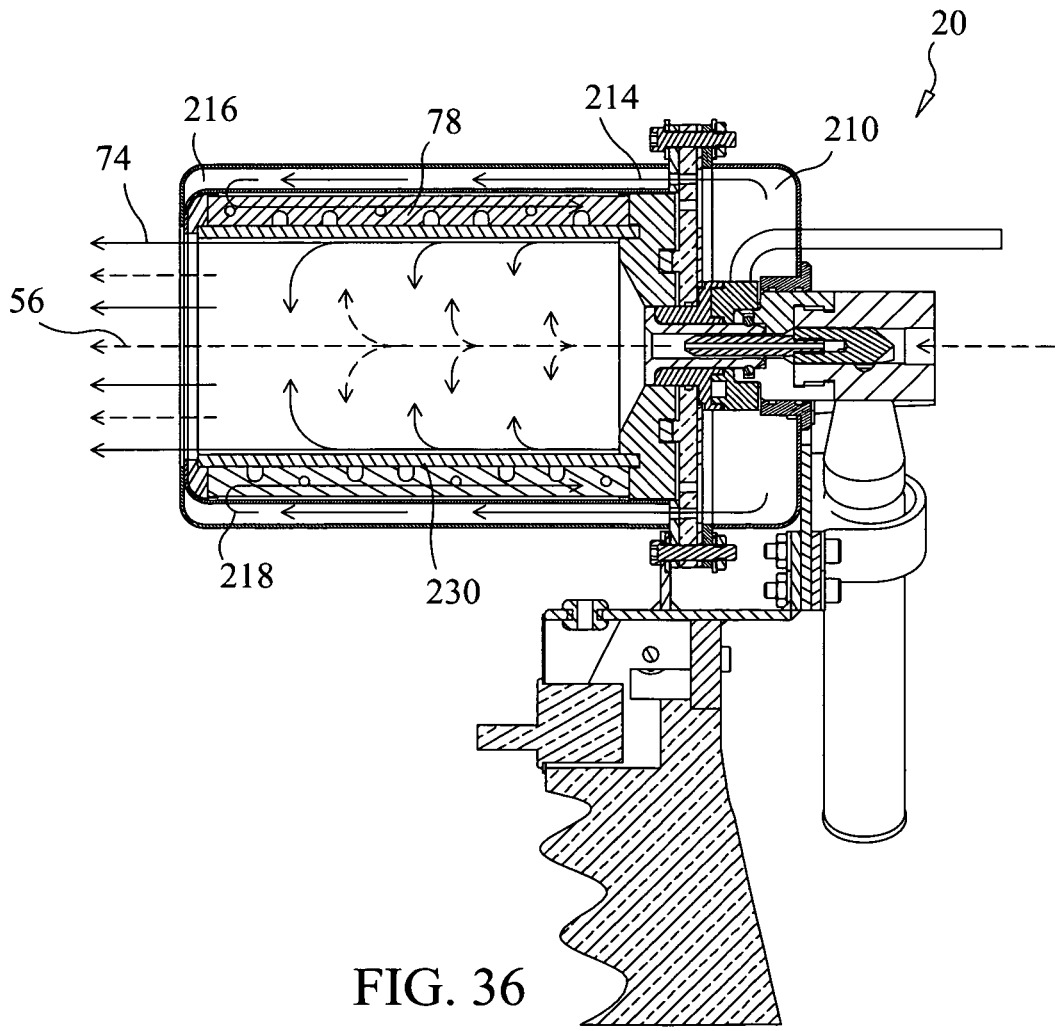
FIG. 36 is a cross-sectional view of the thermal spray gun portion of an illustrative embodiment of the invention showing convective heating air flow.

Referring to FIG. 31, the details of the gas jet feature of an illustrative embodiment of thermal spray system 10 is presented. The jets preferred comprise about 16 evenly-spaced ¹⁄₁₆ inch wide by ¼ inch long radial slots 250 cut into aft end cap 244. Radial slots 250 intersect circumferential slot 252 machined into aft end cap 244 that serves to position and retain radiant tube 230. Radial slots 250 are positioned to provide a path for hot gas 74 from heating annulus 220 into radiative/convective heating zone 70. The opening of each of radial slots 250 inboard of the inner diameter of radiant tube 230 inner creates each of jet orifices 250. Each of jet orifices 250 preferably has an area of about 0.0015 $in^2$. At a gas flow rate of about 3 cubic feet per second (cfm), the velocity of the jet flow from each of the orifices 250 is approximately 3,600 in/sec. At this speed, a portion of the jet flow remains attached to the inner wall of radiant tube 230 for the entire length of radiant tube 230, serving as a barrier to buildup of molten polymer on the inner wall of radiant tube 230. As shown in FIG. 36, the remainder of the gas in the hot jet mixes with and melts polymer powder 48 contained in carrier gas 40 that is exiting spray nozzle 66. The low velocity molten material exits the end of radiant tube 230, carried along by the combination of carrier gas 40 and hot gas 74 from the heating jets and strikes substrate material 82 which is to be coated.

Figure 32:
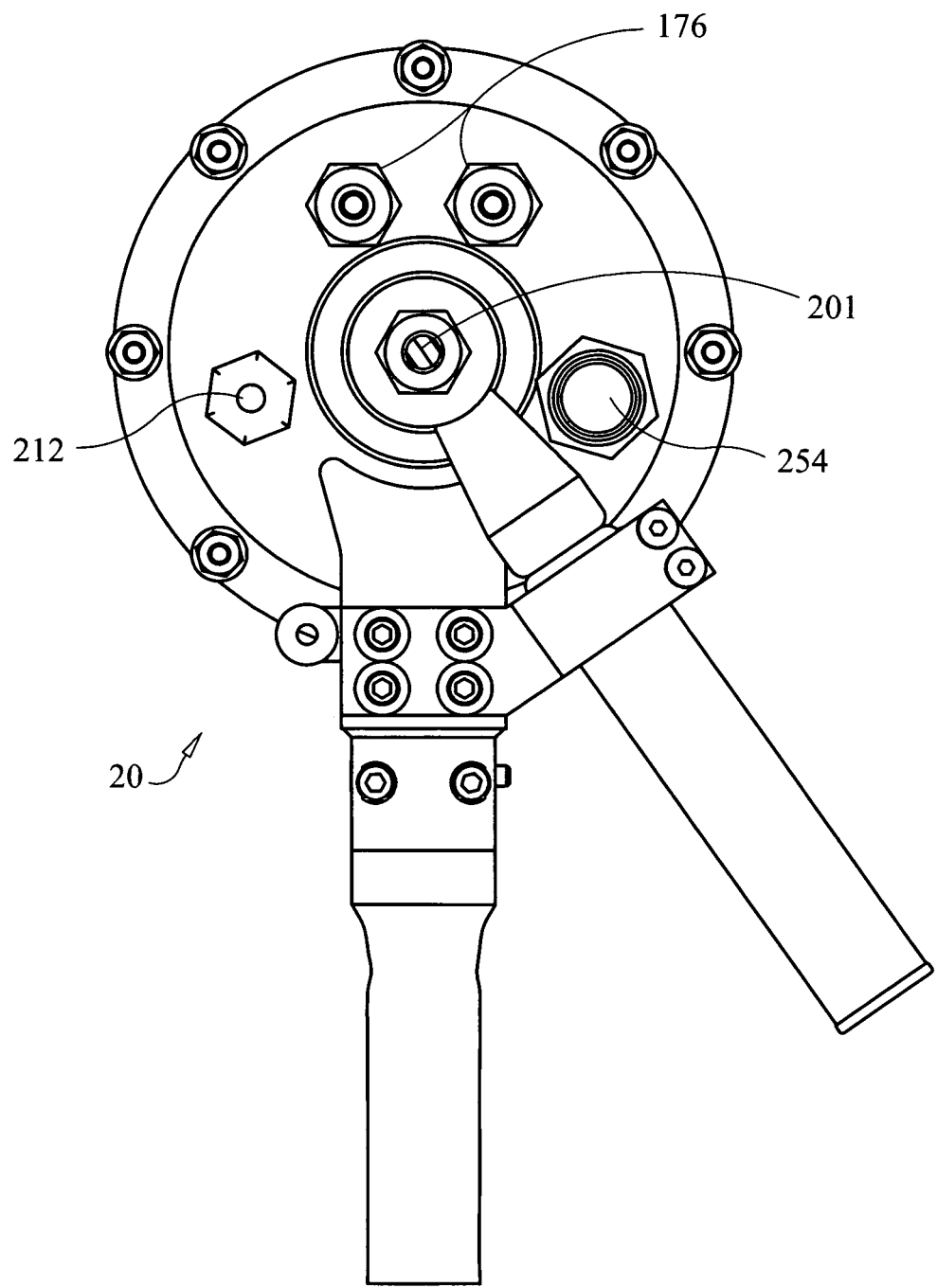
FIG. 32 is a rear elevation view of the connectors on the thermal spray gun of an illustrative embodiment of the invention.

Referring to FIG. 32, a rear view of spray gun 20 of an illustrative embodiment of system 10 is presented. Nozzle cooling media inlet and outlet ports 176, carrier gas inlet 201, convective heating gas inlet 212, and air tight connector 254 for the heater element hookup wire are shown.

Figure 33:
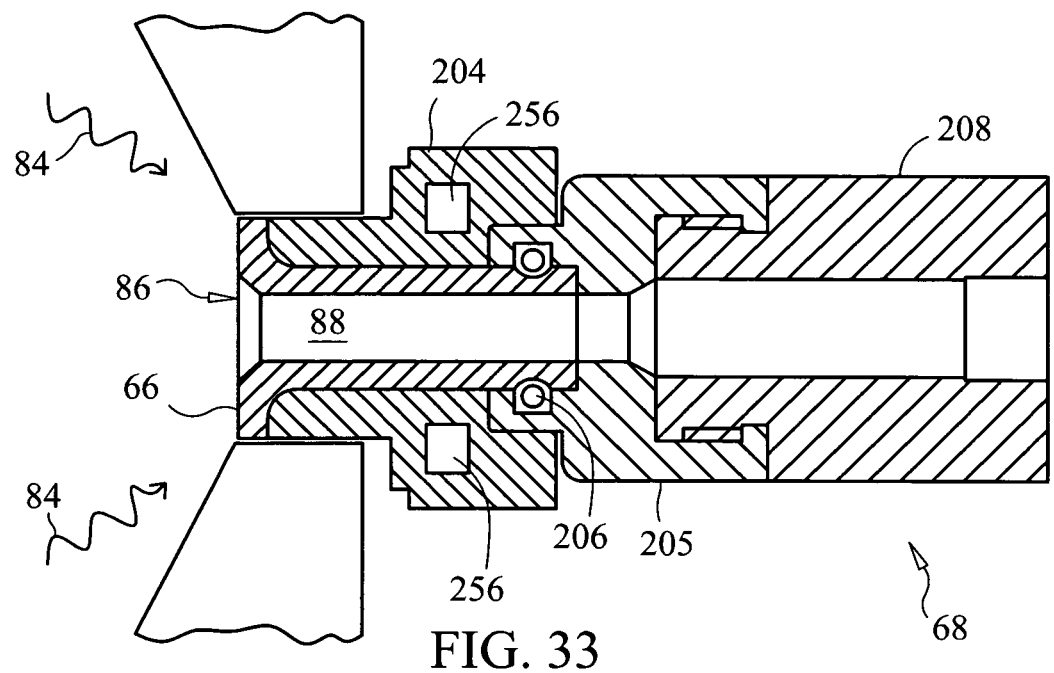
FIG. 33 is a longitudinal cross-sectional view of the nozzle assembly of an illustrative embodiment of the invention.

Referring to FIG. 33, a longitudinal cross-sectional view of an illustrative embodiment of nozzle assembly 68 mounted in aft end cap 244 is presented. During operation of this embodiment of system 10, transfer of radiant heat 84 elevates the temperature of nozzle face 86. If the temperature of nozzle face 86 exceeds the melting temperature of polymer 48 as it is being sprayed, polymer 48 can begin to build up on nozzle throat 88 at or near the exit of nozzle 66. If allowed to occur, this buildup eventually chokes the flow of carrier gas 40. In an illustrative embodiment, nozzle face has a smaller nozzle face diameter (e.g., 0.99 inch) versus the 1.25 inch diameter for less preferred embodiments, while maintaining an adequate inner diameter for nozzle throat 88. Using a smaller nozzle face diameter reduces by over thirty percent the area of nozzle face 86 that can be heated by radiation. This in turn reduces the rate of heat buildup in nozzle 66.

Figure 34:
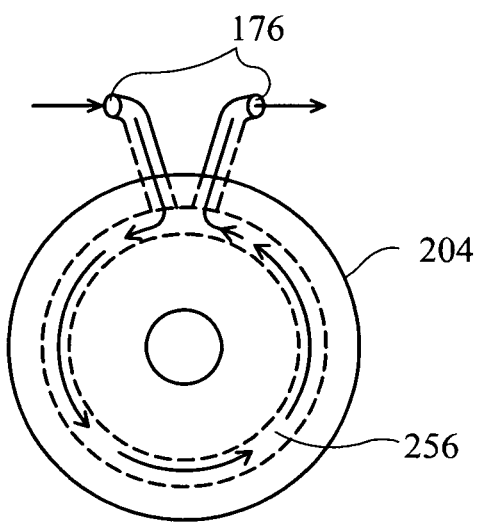
FIG. 34 is a transverse cross-sectional view of the heat sink of an illustrative embodiment of the invention.

Referring to FIG. 34, a transverse cross-sectional view of an illustrative embodiment of heat sink 204 is presented. In this preferred embodiment, nozzle assembly 68 comprises heat sink 204 that is in intimate contact (e.g., via conductive paste) with the exterior surface of nozzle 66. Heat absorbed by nozzle face 86 is conducted through the nozzle material and into heat sink 204, which is preferably made of copper or some other material with a high heat transfer coefficient. This heat is further conducted to the heat sink cooling channel 256 where it is convectively removed by the circulating heat sink fluid. The cooling fluid is typically water that enters cooling channel 256 via the cooling medium inlet connector. It then circulates circumferentially in cooling channel 256 before exiting via the cooling medium outlet connector. This cooling operation keeps nozzle tip 86 from fouling, an improvement over less preferred embodiments.

Figure 35:
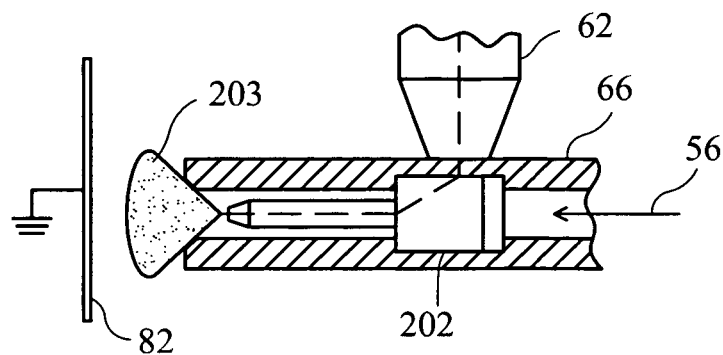
FIG. 35 is a longitudinal cross-sectional view of the nozzle of an illustrative embodiment of the invention showing its relation to the corona tip.

Referring to FIG. 35, a longitudinal cross-sectional view of nozzle 66 of an illustrative embodiment of thermal spray system 10 is presented showing its relation to corona tip 202. In this embodiment, corona tip 202 lies in the flow stream of carrier gas 40. The flow stream of carrier gas 40 is split and flows around corona tip 202 as it proceeds towards the exit of nozzle 66. Corona tip 202 provides for a point source termination of high voltage cascade 62 that produces a corona discharge field in high-voltage electrode corona discharge space 203. The particles of polymer 48 passing through this field acquire a charge and are attracted to grounded substrate 82.

Referring to FIG. 36, a cross-sectional view of thermal spray gun portion 20 of an illustrative embodiment of the invention is presented, showing the flow of convective heating air 74 and carrier gas 40. Solid arrows represent the flow of convective heating air 74 in an illustrative embodiment of the present invention. In this embodiment, ambient temperature convective heating air 74 enters system 10 through rear plenum 210. This convective heating air 74 is then directed through aft end 214 of outer cooling annulus 218. While flowing through annulus 218, convective heating air 74 picks up heat that is flowing outward though the walls surrounding radiant/convective heating zone 70 of gun 20 and reduces the temperature of outer shroud 174. At forward end 216 of cooling annulus 218, convective heating air 74 is directed into inner heating annulus 78. Convective heating air 74 flows towards aft end cap 244 of device 10 over and around coiled heating elements 72. In inner heating annulus 78, convective heating air 74 is further heated. Finally, the hot convective heating air 74 is directed into inner cavity 70 of radiant tube 230 of though small orifice openings 250, which are preferably machined into aft end cap 244 and distributed around the edge of heating annulus 78. These openings form jets of hot gas that enter cavity 70 along the inner wall of radiant tube 230. These attached jets of convective heating gas 74 are described below. These jets of hot gas mix with carrier gas stream 40 that contains entrained polymer powder 48 (i.e., mix with mixture 56, the flow of which is represented by dashed arrows).

The tendency for a free jet of gas to attach itself to a nearby wall is known as the Coanda Effect. A jet of gas normally entrains surrounding gas as its momentum diffuses outwards. If the jet is close to a wall then the jet cannot draw gas through the wall and the jet itself is attracted towards the wall, attaching itself to the wall. In effect, some of the momentum of the jet is maintained and allows the jet to travel along the wall until the momentum diffusion occurring on the free surface has dissipated the jet. The inlet velocity of the jet determines the momentum of the flow. The higher the inlet velocity, the farther the jet flows along the wall. In a more preferred embodiment of the present invention, the jet inlet velocity is established at a rate that is large enough to allow the incoming hot air jets to remain un-dissipated and attached the full length of radiant tube 230.

In the preferred embodiment illustrated in FIG. 36, the jets of hot convective heating gas 74 serve three purposes. The hot gas 74 mixes with the stream of fluidized polymer mixture 56 that is entering inner chamber 70 through spray nozzle 66 and causes polymer material 48 to heat to melt temperature. The jets of hot gas 74 also serve to keep the molten particles of polymer 48 from adhering to the inner wall of radiant/convective heating zone 70. Jets of gas 74 with sufficient velocity tend to attach themselves to a surface adjacent to the jet exit. A portion of the jet remains attached to the inner wall of the heating zone 70 as it travels the length of radiant tube 230 and exits into free space. Finally, portions of the hot jets tend to diffuse into the flow of carrier gas 40 that has fluidized and transported polymer material 48 into heating zone 70. The mixing of convective heating gas 74 and the mixture of carrier gas 40 and polymer 48 results in a more uniform thickness of the deposited sprayed material. Without this diffusion, the thickness of the spray pattern tends to be greatest at the center of the spray pattern and rapidly tapering away towards the outer radius of the pattern.

In an illustrative embodiment, thermal spray system 10 allows for onsite application of high temperature, high performance polymer foams. Thermal spray system 10 has been used to investigate the fabrication of a number of foam compositions comprising friable polyimide microballoons, polyimide binders, polyetherimide binders, liquid crystal polymer binders, blowing agents, hollow ceramic spheres, hollow glass spheres, and thermoplastic base coats. A particular advantage demonstrated by preferred embodiments of this technology is the ability to process high melt temperature polymers such as polyamides (500° F.), polyetherimides (700° F.) and polyimides (700° F.).

The operational procedure for preparing foams is simple and easy to follow. An illustrative sequence of the steps and settings is as follow for fabricating a polyimide spray foam using polyimide microballoons and a polyimide powder binder: Plug in a 480 volt single phase power into the socket at rear of device 10. Attach nitrogen and compressed air lines to the pair of carrier gas inlet connectors (quick connects 128) at the rear of device 10. Initially, select air as the carrier gas using the carrier gas selection switch 142. Adjust eductor/carrier gas flowrate to about 30 liters per minute (lpm) with eductor/carrier gas flowmeter 42 and set spray gun convective heating gas flowrate to about 100 µm with marked flowmeter 76. Adjust the eductor/carrier gas heating set point to a desired temperature of about 200° C. and engage the switch to right of controller 45. Additionally, set the umbilical heating controller to about 200° C. to maintain desired umbilical temperature and engage the switch to right of controller 146. Set the spray gun convective heating gas heater controller 144 to a desired power level of about 210 volts. Mix the desired proportion of polymer microspheres and binding resin (typically 80:20 by weight). It takes approximately 10 liters of the premixed polymer microspheres and binder resin material to prepare a 30 centimeter (cm)×30 cm panel 3 cm thick. That is, place 10 liters of premixed material in the hopper for every 2.7 liters of foam to be produced. The amount of foam desired depends on the surface area to be coated and the depth of coating required. Place the formulated contents into the powder bin 16 and close the latches. Once the temperature of the umbilical heater line is at steady state, device 10 is ready to spray foam panels.

Forming a spray foam panel involves the following steps: Wear respirator, eye protection, light duty gloves, and work in well-ventilated area. Engage the high voltage corona by pressing the push-button switch 64. Select nitrogen gas using carrier gas selection switch 142 when spraying powder. During cleaning, warm-up and cool-down leave carrier gas selection switch 142 in the compressed air or off position. Begin spraying by squeezing powder delivery trigger 172 on gun grip 170. Block in the perimeter of the area to be coated with light coats and bake these coats onto surface 82. Once a base coat has been created, add additional layers in a manner similar to painting with a paint spray gun. With the trigger disengaged, recoat the area just sprayed with the stream of hot gas issuing from the spray gun 20. Continue as needed to flow and melt the foam constituents. During cool-down, power down eductor and umbilical heaters (leave air flow on). Reduce the convective heater gas heater controller until the switch snaps off. Turn off vibrator 126 and corona with push-button switches. Let air flow through device 10 for at least ten minutes. Clean spray gun 20, shut off the air supply and close the valve on the nitrogen bottle.

More preferred embodiments of system 10 experience decreased material fouling that is associated with less preferred (e.g., undirected, diffuse heating gas) thermal spray systems due to the incorporation of the attached jet cleansing gas feature into more preferred embodiments. In the more preferred embodiments, the attached jet hot gas flow convectively transfers heat to polymer powders 48 entrained in the carrier gas flow. The attached jet gas keeps polymer powder from accumulating on the inner wall of radiant tube 230. The attached jet gas flow diffuses into the carrier gas flow and creates a more uniform thickness of the deposited, sprayed material.

In a more preferred embodiment of the invention, the overall size and weight of spray gun 20 is reduced when compared to less preferred embodiments. In a less preferred embodiment, spray gun 20 is about 6.5 inches in diameter and weighs about 12 lbs. In a more preferred embodiment, spray gun 20 is about 4.6 inches in diameter and weighs less then 6 lbs. This is a significant ergonomic improvement. The smaller diameter makes it easier for the operator to watch the surface being sprayed and the lower weight reduces handling fatigue.

In a more preferred embodiment of the invention, spray gun 20 comprises improved means for reducing tip fouling, e.g., a heat sink to reduce nozzle tip temperatures. In comparison, less preferred embodiments direct incoming ambient air around the outside of the nozzle to help cool the nozzle. In these embodiments, the rate of heat removal may not keep up with the rate of nozzle heating during sustained spray operations. More preferred embodiments have enough heat removal capacity to keep the nozzle tip temperature below the sticky/melt temperature of the polymer powder 48. With a cooler nozzle, the polymer powder does not melt in the nozzle throat and clog the nozzle.

In a more preferred embodiment of the invention, the outer surface of radiant shroud 174 has a lower temperature during operation. In less preferred embodiments, the temperature of the outer surface of radiant shroud 174 can reach 170° C. When operating more preferred embodiments at settings that produce equivalent exit temperatures, the temperature of the outer surface of radiant shroud 174 can be maintained below 65° C. This is due to the improved circulation path of incoming convective heating gas 74 as described above.

In a more preferred embodiment of the invention, reduced charring and fouling of polymer material on the inner surface of radiant tube 230 occurs during operation of system 10. This is due to the cleansing, air curtain effect of the attached jet flow. The attached jets prevent polymer material 48 that is entrained in carrier gas 40 from coming into contact with the inner walls of radiant tube 230.

In a more preferred embodiment of the invention, an improved spray pattern is produced. In less preferred embodiments, the spray pattern is dominated by the momentum of carrier gas 40 and tends to be small in diameter and produce a non-uniform application of material. In the more preferred embodiments, carrier gas 40 is diffused by the jets of convective heating air 74. This creates a spray pattern that is larger in diameter with improved applied thickness uniformity.

In an illustrative embodiment, polymer 48 is seeded with a conductive material before it is entrained in carrier gas 40. Preferably, polymer 48 is seeded with a conductive material produced by Potters Industries Inc., called D90. This conductive material comprises silver-coated hollow glass spheres with a nominal diameter of about 62 micrometers ($\mu$m) and a bulk density of about 0.5 grams per cubic centimeter (g/cc).

Other Potters Industries' materials that are appropriate for spraying with system 10 range from 20 to 100 micrometers in diameter and comprise coated and uncoated metal, glass, ceramic, or plastic hollow or solid spheres, some with metal or organic coatings. A person having ordinary skill in the art will know that there are other manufacturers of such products.

The applicants believe that, with preferred embodiments of system 10, the low velocity (less then 1000 inches per second nozzle exit velocity) of sprayed material 4 provides advantage over the high velocity thermal spray devices in the background art. This low speed flow technology is well suited for spray coating using particles of various sizes, shapes, and densities as is the case with syntactic coatings, functionally graded coatings, and structural coatings. The low velocities result in lower drag forces on the particles in flight. Therefore, it is possible to use particles with higher drag coefficients with system 10 than with background art devices.

The low velocities possible with preferred embodiments of system 10 also enable the use of electrostatic charging technology. The inertial forces induced in the polymer spray 56 are low enough to be overcome by the electrostatic attractions that direct charged particles to grounded substrate 82. This results in increased material transfer efficiency.

Figure 37:
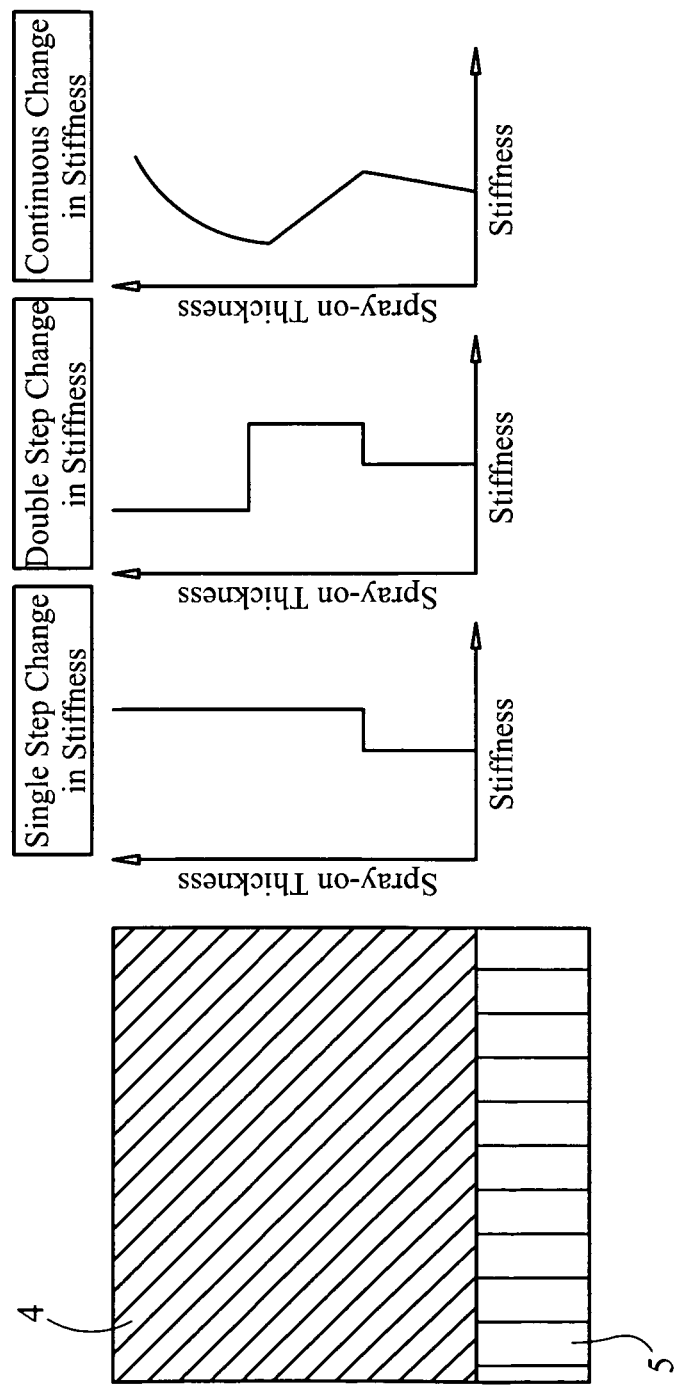
FIG. 37 is a schematic diagram that illustrates how sprayed material properties may be changed.

Referring to FIG. 37, underlying structure 5 is a bulkhead or other material that is transmitting the sound that needs mitigated. The properties of thermally sprayed material 4 may be varied by changing the sprayed material recipe, varying the amount of blowing agent(s), varying the amount of heat energy and/or varying the heating stream flow rate and/or velocity. The material properties that can be modified through these methods include stiffness, damping constant and density, all of which are related to the material's ability to absorb sound energy generated by an underlying structure or substrate. The properties maybe varied by a step change or a continuous change. Examples of the changes that are possible are shown in FIG. 37, which shows that stiffness may be changed by a single step change, by multiple step changes or by continuously changing the aforementioned properties.

Many variations of the invention will occur to those skilled in the art. Some variations include applying elastomeric materials (e.g., a viscoelastic polymer matrix 3) and a plurality of tuned mass resonators 2 simultaneously. Other variations call for installation of acoustic insulation 1 using electrically-heated or combustion-heated thermal spray systems. Other variations call for applying a viscoelastic polymer matrix 3 either before or after installing one or more tuned mass resonators 2. Other variations call for use of discrete mass absorbers 27. All such variations are intended to be within the scope and spirit of the invention.

Although some embodiments are shown to include certain features or steps, the applicants specifically contemplate that any feature or step disclosed herein may be used together or in combination with any other feature or step on any embodiment of the invention. It is also contemplated that any feature or step may be specifically excluded from any embodiment of the invention.

What is claimed is:

1. An acoustic insulation for an underlying structure having an underlying structure impedance and a underlying structure surface that oscillates as it emits sound, said underlying structure surface having a mode shape with a plurality of anti-nodes, each of said anti-nodes having a natural frequency, said acoustic insulation comprising:
a sprayed-on thermoplastic polymer matrix that is installed on and adheres to the underlying structure; and
a plurality of discrete masses that are suspended in said polymer matrix;
wherein each of said discrete masses is disposed adjacent to one of the anti-nodes and is tuned to have an impedance that is approximately the same as the underlying structure impedance and that is operative to resonate at the natural frequency of the adjacent anti-node;
wherein said sprayed-on thermoplastic polymer matrix is installed using a process comprising: introducing a mixture of a carrier gas, polymer, and blowing agent into an inner chamber of a thermal spray gun; introducing a first gas into an annular region surrounding the inner chamber of the thermal spray gun and introducing the first gas into the inner chamber through a plurality of openings from the annular region into the inner chamber; heating the first gas to yield a heated gas; heating the mixture by mixing it with the heated gas, such that the polymer does not substantially build up on the inner chamber; and spraying the heated mixture onto the underlying structure to form a foam.

2. The acoustic insulation of claim 1 wherein said polymer matrix comprises:
a viscoelastic material.

3. The acoustic insulation of claim 2 wherein said viscoelastic material comprises:
an open-cell foam or a closed cell foam, or combination thereof.

4. The acoustic insulation of claim 1 wherein said polymer matrix comprises:
a homogeneous layer or a plurality of heterogeneous layers.

5. The acoustic insulation of claim 1 wherein each of said a plurality of discrete masses is made out of a material having a density that is higher than that of said polymer matrix.

6. The acoustic insulation of claim 1 wherein each of said a plurality of discrete masses is made out of a material having an elastic constant that is higher than that of said polymer matrix.

7. The acoustic insulation of claim 1 further comprising:
a fire retardation member, a blast protection member or a projectile protection member, said member or members being installed on said polymer matrix.

8. A discrete mass absorber for mounting on an underlying structure having an underlying structure impedance and a underlying structure surface that oscillates as it radiates sound, said underlying structure surface having an anti-node having a natural frequency, said discrete mass absorber comprising:
a polymer material;
a discrete mass that is disposed or encased within said polymer material, said discrete mass being tuned to have an impedance that is approximately the same as the underlying structure impedance and being operative to resonate at the natural frequency; and
a hermetically sealed or air tight housing within which said polymer material and said discrete mass are disposed;
wherein said polymer material is installed using a process comprising: introducing a mixture of a carrier gas, polymer, and blowing agent into an inner chamber of a thermal spray gun; introducing a first gas into an annular region surrounding the inner chamber of the thermal spray gun and introducing the first gas into the inner chamber through a plurality of openings from the annular region into the inner chamber; heating the first gas to yield a heated gas; heating the mixture by mixing it with the heated gas, such that the polymer does not substantially build up on the inner chamber; and spraying the heated mixture onto the underlying structure to form a foam.

9. The discrete mass absorber of claim 8 further comprising:
a plurality of discrete masses that are disposed or encased within said polymer material;
each of said discrete masses being tuned to have an impedance that is approximately the same as the underlying structure impedance and being operative to resonate at the natural frequency.

10. An apparatus for reducing the sound radiated from an insulated or non-insulated vibrating surface comprising:
a vibration-excited resonant absorber comprising a polymer material and a discrete mass that is disposed or encased within said polymer material, said discrete mass being tuned to have an impedance that is approximately the same as the underlying structure impedance of the insulated or non-insulated vibrating surface and that is tuned for a specific adjusted system frequency or a range of frequencies at which the insulated or non-insulated vibrating surface vibrates with the apparatus attached to it;
wherein said polymer material is installed using a process comprising: introducing a mixture of a carrier gas, polymer, and blowing agent into an inner chamber of a thermal spray gun; introducing a first gas into an annular region surrounding the inner chamber of the thermal spray gun and introducing the first gas into the inner chamber through a plurality of openings from the annular region into the inner chamber; heating the first gas to yield a heated gas; heating the mixture by mixing it with the heated gas, such that the polymer does not substantially build up on the inner chamber; and spraying the heated mixture onto the underlying structure to form a foam.

11. The apparatus of claim 10 wherein said vibration-excited resonant absorber is operative to resonate at particular frequencies at an anti-node location corresponding to the mode shape frequency of the insulated vibrating surface.

12. The apparatus of claim 10 wherein said polymer material comprises at least one of: an elastic material and a viscoelastic material.

13. The apparatus of claim 10 further comprising:
a plurality of vibration-excited resonant absorbers that are operative to absorb a range of frequencies.

14. The apparatus of claim 13 wherein the plurality of vibration-excited resonant absorbers comprise:
a plurality of single-frequency vibration-excited resonant absorbers or a plurality of mass-tuned vibration-excited resonant absorbers.

15. The apparatus of claim 10 wherein said vibration-excited resonant absorber resonates at a plurality of specific mode shape frequencies for a particular anti-node location.

16. The apparatus of claim 10 wherein said vibration-excited resonant absorber comprises:

one or more of said discrete masses and an elastic material and is tuned to resonate at particular frequencies by having at least one of a selected density of said one or more discrete masses, a selected size of said one or more discrete masses, a selected shape of said one or more discrete masses, a selected orientation of said one or more discrete masses, a selected distance of said one or more discrete masses from the insulated vibrating surface, a selected visco-elastic property of said elastic material, and a selected visco-elastic property of said one or more discrete masses.

17. The apparatus of claim 16 wherein said vibration-excited resonant absorber comprises more than one discrete mass and is tuned to resonate at particular frequencies by also having at least one of: a selected distance between said more than one discrete masses, a selected distance between said more than one discrete masses throughout the thickness of said elastic material.

18. An apparatus for reducing the sound radiated from a vibrating surface with existing sound insulation, said vibrating surface with existing sound insulation having a plurality of anti-node locations, said apparatus comprising:

a tuned resonant absorber comprising a visco-elastic material and a discrete mass, said tuned resonant absorber being disposed on or adjacent to the vibrating surface with existing sound insulation;

wherein said visco-elastic material is installed using a process comprising: introducing a mixture of a carrier gas, polymer, and blowing agent into an inner chamber of a thermal spray gun; introducing a first gas into an annular region surrounding the inner chamber of the thermal spray gun and introducing the first gas into the inner chamber through a plurality of openings from the annular region into the inner chamber; heating the first gas to yield a heated gas; heating the mixture by mixing it with the heated gas, such that the polymer does not substantially build up on the inner chamber; and spraying the heated mixture onto the vibrating surface with existing sound insulation to form a foam.

19. The apparatus of claim 18 wherein the tuned resonant absorber is tuned to resonate at the anti-node locations at frequencies that correspond to the mode shape frequency of the vibrating surface with existing sound insulation.

20. The apparatus of claim 18 wherein the tuned resonant absorber comprises:

a plurality of masses that are placed at the anti-node locations of the vibrating surface with existing sound insulation.

21. The apparatus of claim 18 wherein the anti-node locations are determined by at least one of: a finite element analysis, a thermo-vibrometry study, a laser vibrometry study, an analysis of the output of an array of accelerometers, a thermography study, a sonar study, an analysis of the output of a displacement or velocity sensor, and an analysis of the output of a strain sensor.

22. The apparatus of claim 18 further comprising a plurality of tuned resonant absorbers that are operative to absorb energy at a range of frequencies.

23. The apparatus of claim 18 further comprising:

a plurality of tuned resonant absorbers selected from the group consisting of: a plurality of single-frequency tuned resonant absorbers and a plurality of mass tuned absorbers.

24. The apparatus of claim 18 wherein the tuned resonant absorber is tuned for energy absorption by considering the amount of damping provided by the viscoelastic effects of its materials of construction.

* * * * *